(12) United States Patent
Carlson et al.

(10) Patent No.: US 12,430,623 B1
(45) Date of Patent: Sep. 30, 2025

(54) OVERCLOCKING SYSTEM FOR DIGITAL CURRENCY MINING AND METHOD OF OPERATION

(71) Applicant: Auradine, Inc., Santa Clara, CA (US)

(72) Inventors: David Carlson, Haslet, TX (US);
Saptadeep Pal, Cupertino, CA (US);
Raju Rakha, Santa Clara, CA (US);
Matthew Tomei, Campbell, CA (US);
Sidong Li, Saratoga, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/784,768

(22) Filed: Jul. 25, 2024

Related U.S. Application Data

(60) Provisional application No. 63/528,890, filed on Jul. 25, 2023.

(51) Int. Cl.
*G06Q 20/06* (2012.01)
(52) U.S. Cl.
CPC ....... *G06Q 20/065* (2013.01); *G06Q 2220/00* (2013.01)
(58) Field of Classification Search
None
See application file for complete search history.

(56) References Cited

U.S. PATENT DOCUMENTS

| | | | | |
|---|---|---|---|---|
| 9,960,909 | B2 * | 5/2018 | Karighattam | H04L 9/0643 |
| 12,200,139 | B1 * | 1/2025 | Tomei | H04L 9/3236 |
| 2015/0294308 | A1 * | 10/2015 | Pauker | G06Q 20/02 |
| | | | | 705/67 |
| 2016/0164672 | A1 * | 6/2016 | Karighattam | H04L 9/0643 |
| | | | | 380/28 |
| 2017/0300875 | A1 * | 10/2017 | Gilboa | G06F 1/324 |
| 2022/0076726 | A1 * | 3/2022 | Hulton | G06F 11/076 |
| 2024/0152176 | A1 * | 5/2024 | Beck | G06F 1/10 |

FOREIGN PATENT DOCUMENTS

| | | | |
|---|---|---|---|
| KR | 102137956 B1 * | 7/2020 | |
| WO | WO-2022093870 A1 * | 5/2022 | |
| WO | WO-2022098753 A1 * | 5/2022 | G06F 1/06 |

OTHER PUBLICATIONS

Google Patents English language translation of KR 102137956 B1. https://patents.google.com/patent/KR102137956B1/en?oq=KR+102137956+B1 (Year: 2024).*

* cited by examiner

*Primary Examiner* — Ayal I. Sharon
(74) *Attorney, Agent, or Firm* — Shield Intellectual Property PC

(57) ABSTRACT

An electronic system for calculating and mining digital currency using circuits optimized for efficient utilization of hash engine circuitry by determining an effective hash clock operational frequency for one or more hash engines in the system. The hash engines can be evaluated to determine a maximum operational frequency for a given error threshold. The hash engines can also be partitioned into one or more hash engine groups to allow different groups to operate at different overclocked frequencies.

20 Claims, 14 Drawing Sheets

OVERCLOCKING SYSTEM FOR DIGITAL CURRENCY MINING AND METHOD OF OPERATION

CROSS-REFERENCE TO RELATED APPLICATIONS

This application claims priority of U.S. Provisional Application Ser. No. 63/528,890, entitled OVERCLOCKING SYSTEM FOR DIGITAL CURRENCY MINING AND METHOD OF OPERATION, filed Jul. 25, 2023 which is owned by the Applicant and is hereby incorporated by reference as if fully set forth herein, under 35 U.S.C. § 120.

TECHNICAL FIELD

Embodiments relate generally to data processing systems for digital currency mining and more specifically, to data processing systems with electrical circuits with variable clock frequency for determining an effective hash rate and methods of operation.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development of electronic circuitry and devices for the purpose of calculating cryptographic data for the mining of digital currencies has been influenced by the physical and electrical properties of the materials and structures used to form the electronic components and electric circuitry. These electrical circuits have included computer processors running software, processors with math coprocessors, gate array components, and dedicated custom computing devices.

Because of the large interest in digital currencies, the data processing systems used to calculate certain cryptographic data have rapidly evolved and increased performance levels. Such systems consume significant amounts of electrical power for proper operation. The power and thermal characteristics of these systems influence the usability and economic viability of operation.

The processing systems for calculating digital currency information are rapidly growing and consuming industrial levels of power and requiring more thermal dissipation elements. The performance trade-off between computing efficacy and power usage must be balanced to make such digital currency operations viable.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following detailed description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. Overview
2.0. System Overview
3.0. Functional Overview
4.0. Example Embodiments
5.0. Extensions and Alternatives

1.0. Overview

Approaches, techniques, and mechanisms are disclosed for manufacturing and operation of the electronic systems discussed herein including electronic systems with variable frequency clocks. The electronic systems can improve performance and enable independent operation of different components of the system.

According to one embodiment, the system can include an array of cryptographic hash engines for calculating hash values in parallel.

According to one embodiment, the electronic system can be configured to calculate a SHA-256 hash engine having at least one expander and at least one compressor for calculating a hash digest of a message.

According to another embodiment, the system can include a predefined test data stored in a database coupled to the control module, the circuit simulation system, and the summary module.

In other aspects, the inventive subject matter encompasses electronic systems configured to carry out the foregoing techniques.

2.0. System Overview

Figure 1:
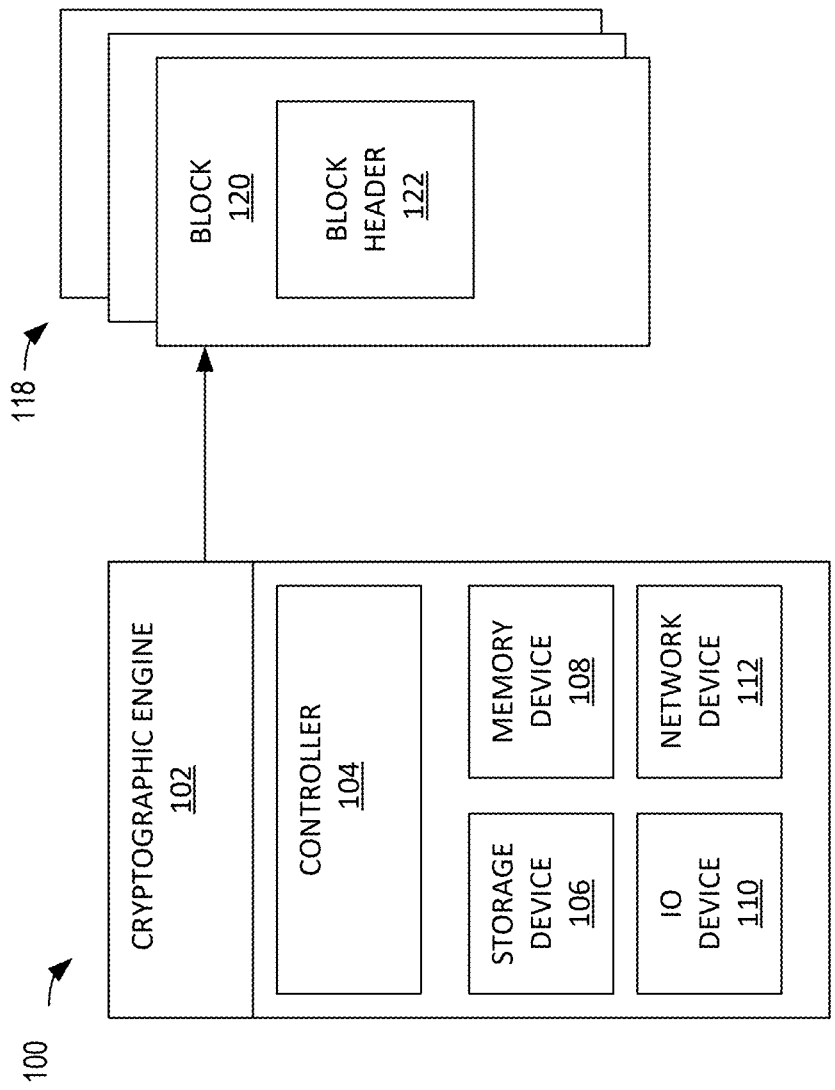
FIG. 1 depicts an example embodiment of a computing system.

FIG. 1 illustrates an example embodiment of an electronic system 100. The electronic system 100, such as a digital currency mining system, can calculate values used for generating blocks 120 of data used to represent elements of a digital ledger, such as used in a blockchain configuration.

The electronic system 100 can have a variety of configurations. In an embodiment, electronic system 100 can include one or more cryptographic engines 102, a controller 104, storage devices 106, memory devices 108, input-output devices 110, and network devices 112.

The cryptographic engines 102 can be used to calculate cryptographic values to represent aspects of the digital ledger including blocks, block headers, hash values, and other similar values. The cryptographic engines 102 can have different hardware and software configurations. For example, the cryptographic engines 102 can be include dedicated hardware devices including portions of application specific integrated circuits (ASIC), field programmable gate arrays (FPGA), custom circuitry, cryptographic accelerators, processors, or other computing devices.

In some embodiments, the cryptographic engines 102 can be dedicated ASIC devices that have been optimized for power, performance, and surface area. In other embodiments, where the electronic system 100 is a digital currency mining system, the ASIC devices can be optimized to maximize other metrics, such as the effective hash rate. The cryptographic engines 102 can also be optimized for effective hash rate which can be related to the overall performance metric. The cryptographic engine 102 optimized for the maximum effective hash rate can be a proxy value for the other metrics for power, performance, and surface area.

In some embodiments, the controller 104 can be a computer processor for controlling the electronic system 100. In yet other embodiments, the controller 104 can include dedicated electronic circuitry for controlling the other elements of the electronic system 100. The controller 104 can be a CPU, microcontroller, state machine, multi-processor, or other similar device.

The controller 104 can be coupled to the storage devices 106, the memory devices 108, the IO devices 110, and the network devices 112. The storage devices 106, such as disk drives, solid state drives, flash memory, or other bulk data storage devices, can be used to store information and data used and generated by the system.

The memory devices 108 are coupled to the controller 104 and provide active memory devices such as random-access memory that is used for regular operation of the system. The IO devices 110 can be used to communicate with other components and can include keyboards, mice, monitors, and other similar devices. The network devices 112 can provide communication links to other systems. The network devices 112 can include ethernet devices, optical communication devices, and other similar communication devices used to form network connections with other systems.

In some embodiments, the electronic system 100 can be used to calculate one or more of the blocks 120 for the digital ledger. The digital ledger, such as a blockchain 118, can record and be used to validate a series of transactions of the digital currency.

In yet other embodiments, the electronic system 100 can be a node on a Bitcoin network which is a peer-to-peer network of nodes that implement the Bitcoin protocol. The Bitcoin protocol facilitates a blockchain based public distributed ledger.

The nodes on the Bitcoin network are configured to be able to communicate with one or more other nodes. Users on the nodes can broadcast messages to the network including transaction messages describing changes to the ledger, such as the transfer of cryptocurrency to other users.

Each of the nodes has a local copy of the entire ledger. If one or more transactions are invalid, then the transaction can be ignored. The transactions can be validated only when the entire set of nodes in the network agree that they are valid.

Figure 2:
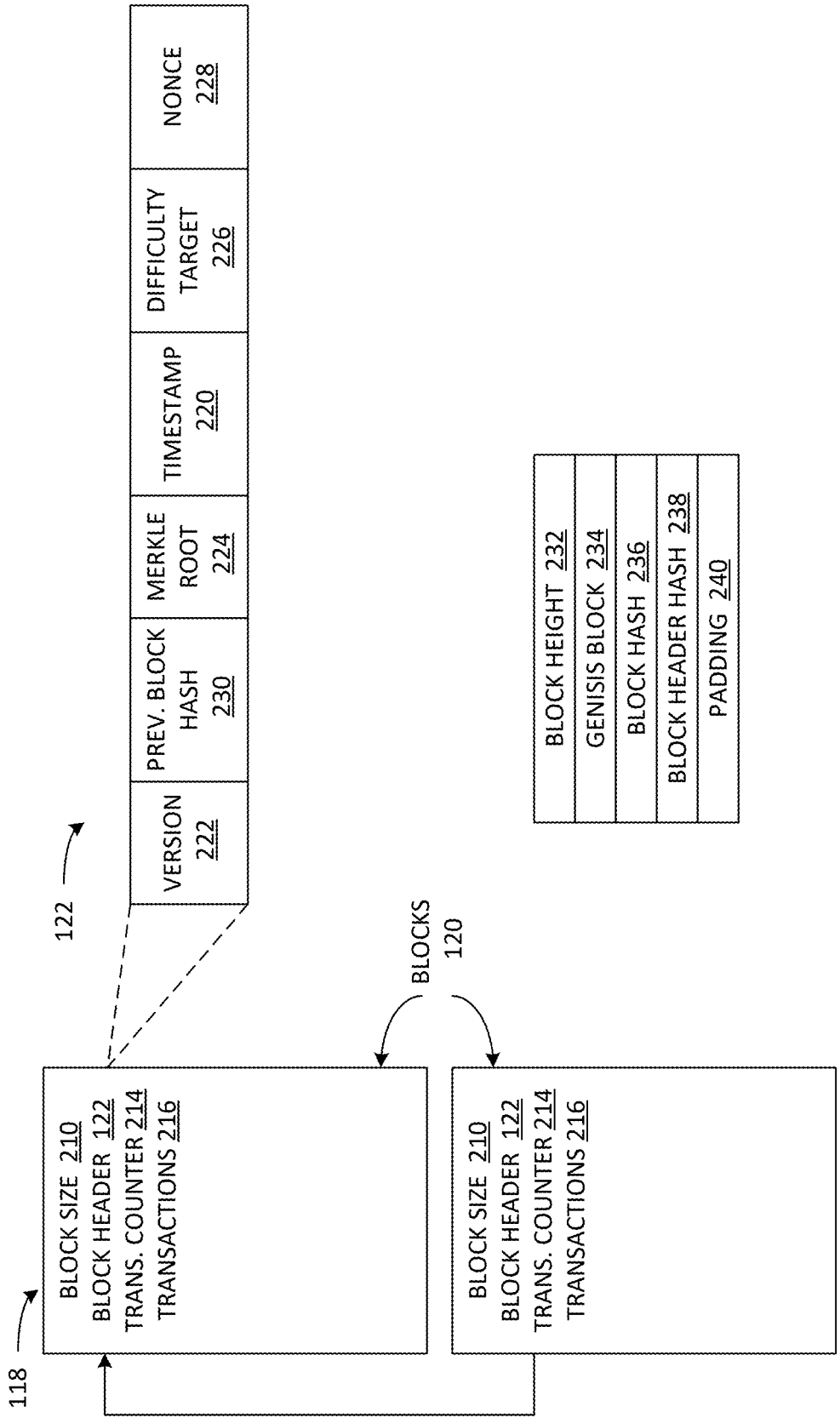
FIG. 2 depicts an example embodiment of a blockchain.

FIG. 2 illustrates an example embodiment of the blockchain 118. The blockchain 118 is a distributed data structure that can represent a digital ledger that can be distributed over a group of computer network nodes. Each of the blocks 120 can include one or more records that describe transactions performed on the digital currency represented by the blockchain 118. Multiple copies of the digital ledger are distributed and stored on the nodes of the network to provide redundancy. This provides a decentralized record of transactions that cannot be altered without being detected simply by comparing one of the blocks 120 on one of the nodes to the equivalent one of the blocks 120 on a different one of the nodes.

The blockchain 118 includes a group of the blocks 120 that are serially linked to one another. In some embodiments, each of the blocks 120 includes block header 122 that includes a pointer to a previous one of the blocks 120 to define the set and order of the blocks 120 making up the blockchain 118.

The blocks 120 can have a variety of data structures. In one embodiment, each of the blocks 120 can include data fields including a block size 210, the block header 122, a transaction counter 214, and a set of transactions 216.

In some embodiments, the block size 210 can be four bytes long and can define the size of the block in bytes. The transaction counter 214 can range between one and nine bytes and indicates the number of transactions 216 in the block 120. The transaction 216 are a variable sized field and includes the details of the transactions 216 recorded in the block 120.

The blocks 120 in blockchain 118 can include entries about the transactions 216 in the block 120. The transactions 216 can include a version number, a flag field, an input counter, an output counter, a set of inputs, a set of outputs, witnesses, and a lock time.

The block header 122 can include a variety of metadata or different data elements used to manage blockchain 118. In some embodiments, the block header 122 can include information such as a timestamp 220, a previous block hash 230, a version 222, a Merkle root 224, a difficulty target 226, and the nonce 228.

In one embodiment, the block header 122 can be sized at 80 bytes. This can include four bytes for the version 222, thirty-two bytes for the previous hash 230, thirty-two bytes for the Merkle root 224, four bytes for the timestamp 220, four bytes for the difficulty target 226, and four bytes for the nonce 228.

The timestamp 220 in the block header 122 is a time of block generation indicating the number of milliseconds since the block was mined. The time is specified as the number of milliseconds since the beginning of the Unix epoch. Valid new blocks must have a timestamp that is within 140 milliseconds of the actual time.

The Merkle root 224 in the block header 122 is a representation of a hashed data structure to show data verification and integrity for the transactions 216 in the block. The Merkle root 224 is a cryptographic value resulting on calculating a hash value on each node of a Merkle tree representing all of the transactions 216 of one of the blocks 120.

The version 222 in the block header 122 describes the blockchain version of one of the blocks 120. The version 222 can be one of several types including version 1.0 for cryptocurrency, version 2.0 for smart contracts, version 3 for decentralized structure, and version 4.0 for industrial applications.

The difficulty target 226 is a value indicating the complexity and the computational power required to mine the network and find new blocks. It represents a threshold value that can be compared to an intermediate hash value to determine. The difficulty target 226 can also be known as the bits field.

The nonce 228 is a number used to validate the information within the block 120 by calculating a hash value of the block header 122 used to validate the block 120. The hash value is validated if the value is less than another one of the hash value of the block 120.

In some embodiments, additional information can be associated with the blocks 120 and the block header 122. These values can include a height 232, a genesis block 234, and a block hash 236 or block header hash 236.

The height 232, or block height, value can indicate how many blocks are before the current block. Height can be derived from the number of layers of blocks if they were all stacked on top of one another.

The genesis block 234 is the first block in the blockchain 118. The genesis block 234 is a known and fixed block and represent a starting value for the previous block 230 of the block 120.

The block hash 236, or the block header hash, is a cryptographic value calculated by performing a hashing operation on the block header 122. The block hash 236 can act as a primary identifier of the block 120. In some embodiments, the block hash 236 can be calculated by performing the SHA-256 hashing operation on the block header 122 twice. This can be designated a double SHA-256 hash operation. The output of the first SHA-256 hashing operation is the input for the second SHA-256 operation to calculate the final double SHA-256 hash result.

The block hash 236 is a unique value because it calculates the hash value on the block header 122 including the updated values of the nonce 228, the Merkle root 224, and the previous block hash 230. In some embodiments, the block hash 236 can be a block header hash 238 which is the hash of just the block header 122. The block hash 236 can also be known as a message hash, message header hash value, hash digest, digest, or a combination thereof. The blocks can also be configured with a padding value 240.

Figure 3:
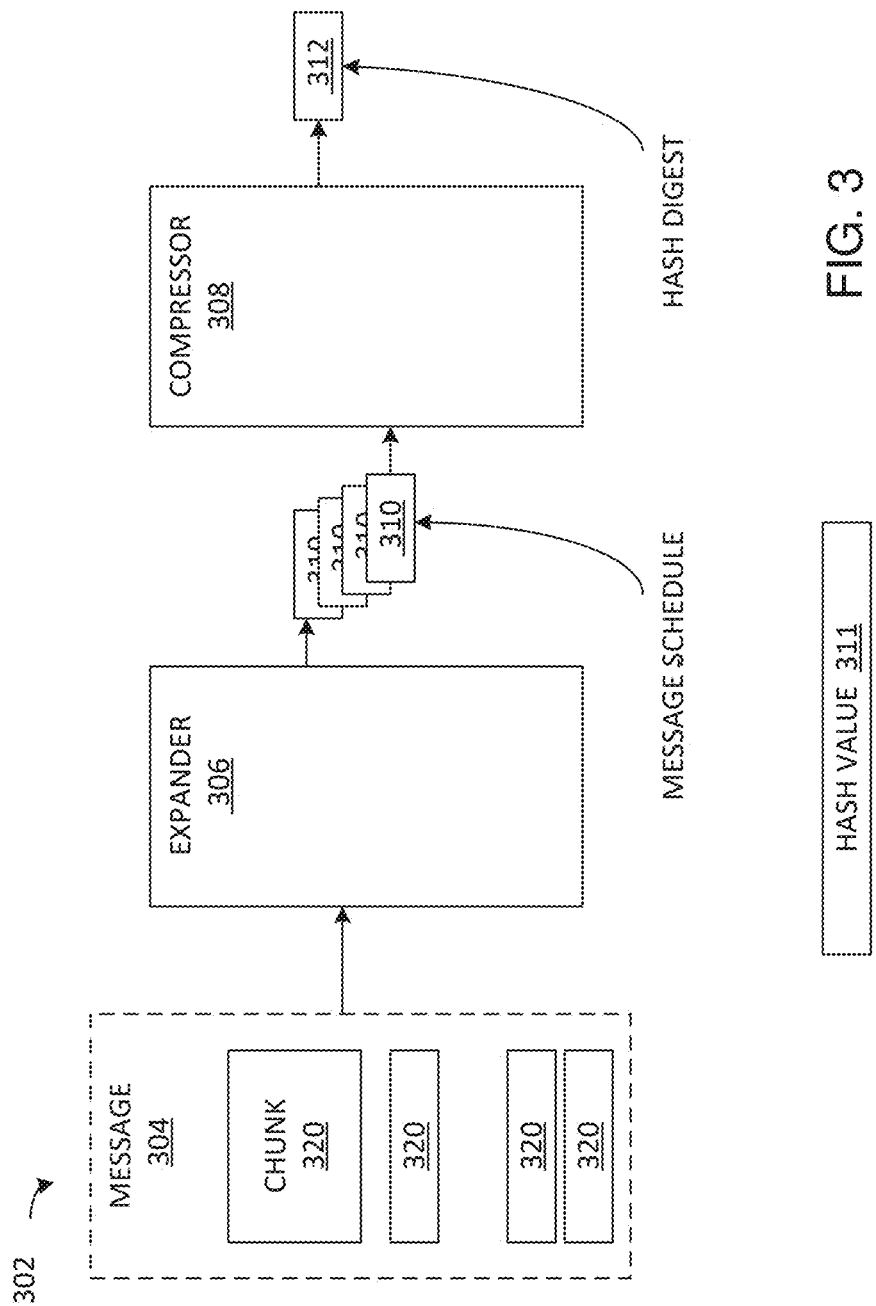
FIG. 3 depicts an example embodiment of a cryptographic hash process.

FIG. 3 illustrates an example embodiment of a cryptographic hash process 302. The hash process 302 can be a SHA-256 hash process.

The Secure Hash Algorithm 256 (SHA-256) is a set of cryptographic hash functions for mapping a message 302 of arbitrary size to a hash value 311 which can be a fixed size value, such as a hash, hash value, hash code, or a hash digest 312. The message 302 can be an arbitrary set of data such as a block of data, a block header, or other similar set of data.

The SHA-256 hash process can divide the message 304 into multiple chunks 320 of sixty-four bytes each and process the chunks 320 serially to generate a final version of the hash digest 312. The chunks 320 are formatted and passed through an expander 306 to generate a message schedule 310 of sixty-four words of thirty-two bits each. Expander 306, such as an expander circuit, an expander module, or an expander function, can receive one of the chunks 320 of 512 bits or sixteen thirty-two-bit words and generate an expander output of sixty-four thirty-two-bit words. The expander 306 can make it harder for cryptographic attackers to control the position of bits in the output.

The output of the expander 306, the message schedule 310, can be passed to a compressor 308. Compressor 308 can compress the output of the expander into a 256-bit hash value for the hash digest 312.

Figure 4:
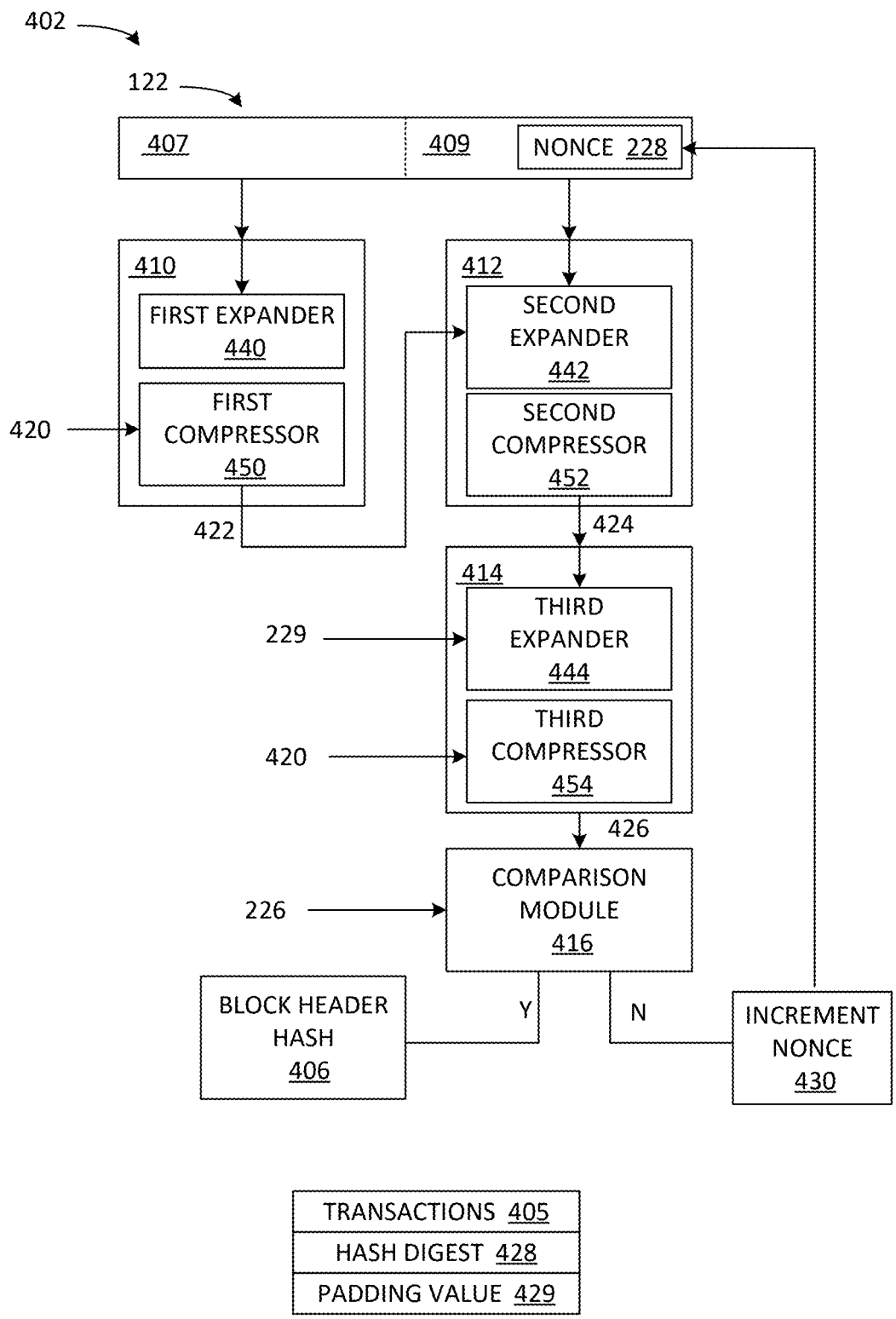
FIG. 4 depicts an example embodiment of digital currency mining process.

FIG. 4 illustrates an example embodiment of a digital currency mining process 402. The digital currency mining process 402 can maintain the public ledger or the blockchain 118 by verifying transactions 405 stored in the blockchain 118.

The digital currency mining process 402, such as the bitcoin mining process, can calculate a block header hash value and update the nonce 228 of the block header 122 that is used to calculate the block hash 236 for the current one of the blocks 120 containing the current value of the nonce 228.

The digital currency mining process 402 can perform a double SHA-256 operation on the block header 122 to determine a block header hash that is less than or equal to the difficulty target 226.

The hash digest 428 is calculated by calculating the nonce 228 for one of the blocks 120 that results in the hash 420 having a value lower than the difficulty target 226.

In some embodiments of the digital currency mining process 402, the first hash module 410, such as a SHA-256 hash module, can receive a first portion 407 of the block header 122 to calculate a first intermediate hash 422 of the first portion 407 of the block header 122. For example, the first portion 407 can be a 512-bit segment of the block header 122. The first portion 407 can be received by a first expander 440 and the result passed to the first compressor 450. The first compressor 450 can also receive a constant value. This produces a first intermediate hash 422 of the first portion 407 of the block header 122 which can be passed to the second hash module 412.

The second hash module 412 can receive a second portion 409 of the block header 122, such as the second 512 bits of the block header 122 including an initial value of the nonce 228, in a second expander 442. The second expander 442 can expand the inputs and pass the result to a second compressor 452. The output of the second compressor 452 is a second intermediate hash 424 which can represent a 1024-bit hash of the block header 122. The second intermediate hash 424 can be passed to a third hash module 414.

The third hash module 414 can receive the second intermediate hash 424 and a padding value 429 in a third expander 444. A third compressor 454 can then receive the output of the third expander 444 and a constant value and can then calculate the block header 426. For example, the block header 426 can be compressed to a 512-bit hash value.

A comparison module 416 can compare the block header 426 to the difficulty target 226. If the block header 426 is less than or equal to that difficulty target 226, then the block 120 is successfully created and the validation is complete. If the block header 426 is not below the difficulty target 226, then an increment nonce module 430 can increment the nonce 228 and the validation process can be cycled again.

Figure 5:
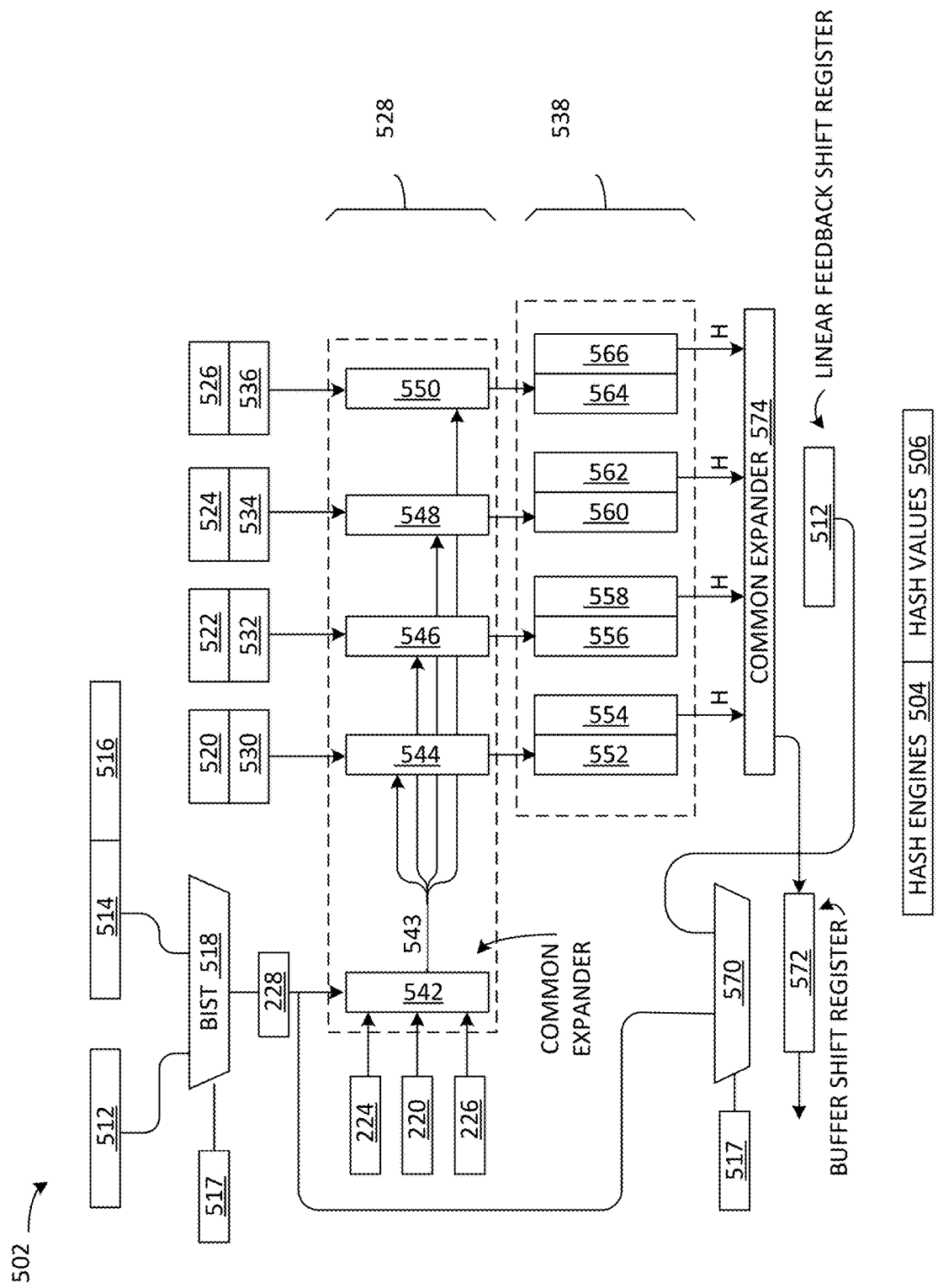
FIG. 5 depicts an example embodiment of a hashing unit.

FIG. 5 illustrates an example embodiment of a hashing unit 502. The hashing unit 502 is a computing device for calculating hash values 506 for a set of chunks of data.

The hashing unit 502 can calculate one or more hash values for a set of data. In some embodiments, the hashing unit 502 can calculate a SHA-256 hash, a SHA-512 hash, a MD5 hash, or other similar hash values.

In an embodiment, the hashing unit 502 can include two or more hash engines 504. In one embodiment, the electronic system 100 can include up to 254 of the hash engines 504. Each of the hash engines can create a hash digest for each record and block. The hash engine can receive portions, or chunks, of data that can be mathematically converted to a hash digest.

In some embodiments, the hashing unit 502 can be configured to include four unrolled double SHA-256 implementation of the hashing unit 502. This can allow a common expander 542 to be shared in common with the other four of the hash engines 504.

The hashing unit 502 can include a built-in self-test multiplexer 518 (BIST multiplexer 518) that can receive a BIST signal 517 for controlling the multiplexer. The BIST multiplexer 518 can receive two sets of input including a linear-feedback shift register 512 (LFSR 512) and a nonce input 515. The LFSR 512 can be the input received from a shift register whose input is a linear function of the previous state. The nonce input 515 can be calculated by combining an engine number 514 and the output of a nonce counter 516. The output of the BIST multiplexer 518 can be the updated value of the nonce 228.

The hashing unit 502 can include a first hash core 528 and a second hash core 538. The first hash core 528 can be configured with a common expander 542 that passes the expander output to four individual compressors.

The common expander 542 can pass the message schedule using a message formed from the nonce 228, the Merkle root 224, the difficulty target 226, and the timestamp 220. The common midstate 543 can be used by the other components, including a first compressor 544, a second compressor 546, a third compressor 548, and a fourth compressor 550.

The first hash core 528 can be configured to use the common expander 542 that is shared with four of the compressors.

In the second hash core 538, each compressor can be configured with a separate expander, such as a fifth expander 552 coupled to a fifth compressor 554, a sixth expander 556. The hash digest coupled to a sixth compressor 558, a seventh expander 560 coupled to a seventh compressor 562, and an eighth expander 564 coupled to an eighth compressor 566.

Each of the compressors can receive a separate midstate, such as a midstate 0, midstate 1, midstate 2, and midstate 3. Each of the hash cores can be configured to iterate only the nonce. The lower eight bits of the nonce will be a constant for each core and equal to a core identification number.

The system can use a midstate value to hold intermediate results. For example, the midstate value can include a zeroth midstate 520, a first midstate 522, a second midstate 524, and a third midstate 526.

The H3I value is a chaining value used when a hash value is calculated piecemeal, such as H3I chain value 0 530, H3I chain value 1 532, H3I chain value 2 534, and H3I chain value 3 536. The midstate value and the H3I values can be provided to the compressor units in the first stage 536 of the hashing unit 502.

The hashing unit 502 can include a second BIST multiplexer 570 that can be controlled by the BIST signal 517. The second BIST multiplexer 570 can have two inputs including the nonce 228 as received from the first BIST multiplexer 518 and the output of the LFSR 512.

The hash digests from the compressors of the second hash cores can be passed to a comparison module 574 to compare the hash digest to the difficulty target 226. If the hash digest is lower than the difficulty target 226, then the result can be sent to a buffer shift register 572 before being passed to a controller.

Figure 6:
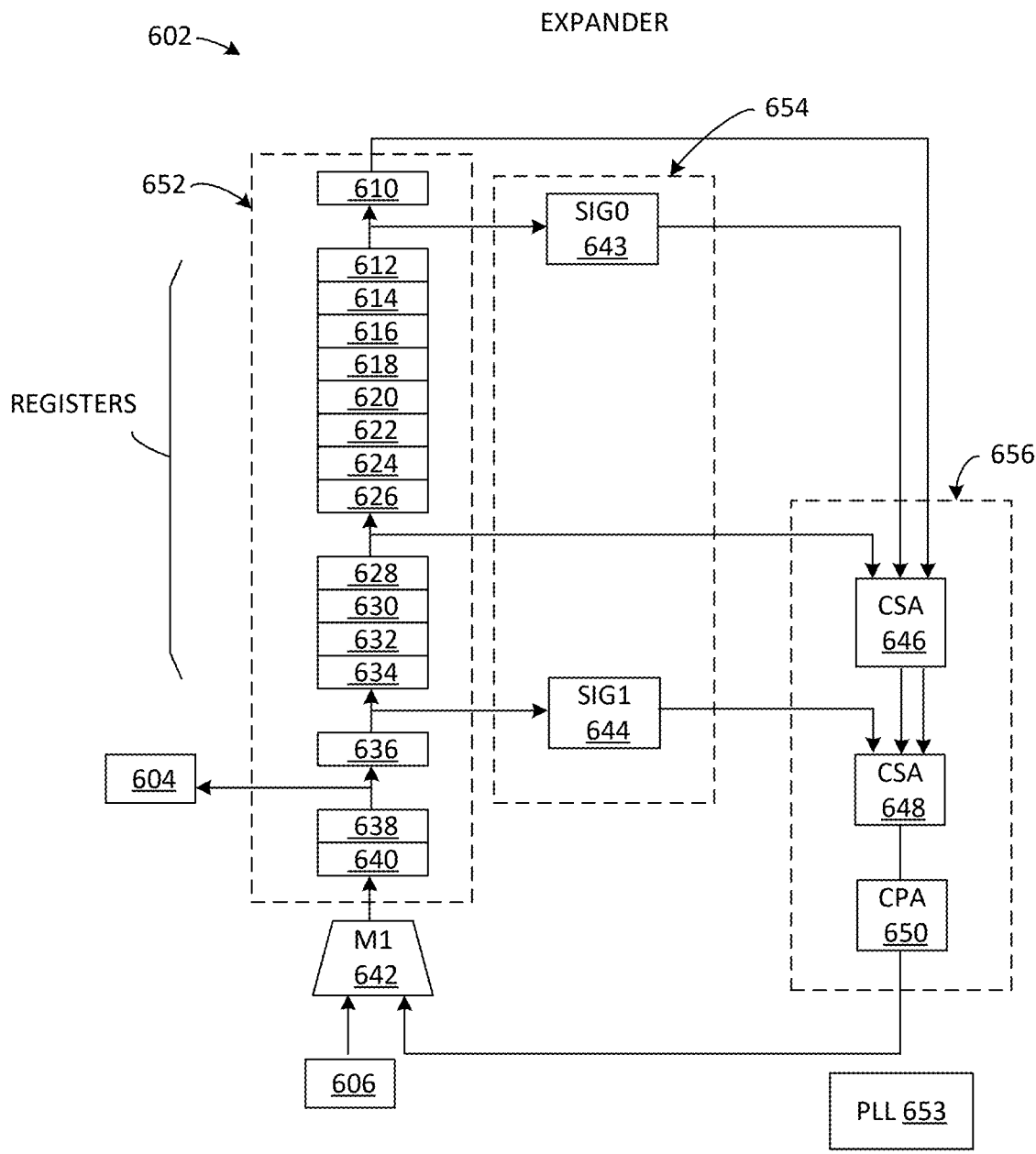
FIG. 6 depicts an example embodiment of an expander unit.

FIG. 6 illustrates an example embodiment of an expander unit 602. The expander unit 602 is a circuit for receiving a message 606 and generating intermediate values for the compressor for calculating a hash value.

The expander unit 602 implements a Message Expander (ME) functionality. In some embodiments, the expander unit 602 can receive the message 606, such as a 512-bit input message, and expand the message 606 into 64 chunks 604 of 32-bit data, such as an array with 64 entries. The chunks 604 are pieces of data generated from message 606.

The expander unit 602 can include a shift register array 652, a sigma block 654, and an adder block 656. The shift register array 652 can be a multi-stage shift register for linearizing the chunks of the message 606.

In some embodiments, the expander unit 602 can include a multiplexer unit 642 which can receive the message 606 and an output from an adder block 656 and send the portions of the message 606 to the multi-stage shift register array 652.

The chunks 604 of the message 606 can be passed to the multi-stage shift register array having a register 610, a register 612, a register 614, a register 616, a register 618, a register 620, a register 622, a register 624, a register 626, a register 628, a register 630, a register 632, a register 634, a register 636, a register 638, and a register 640. The expander unit 602 can generate a message schedule 660 having the 64 chunks 604 of data in a specified order. The registers can be used to hold different chunks 604 of the message schedule 660.

The sigma block 654 can include one or more sigma function units, such as a first sigma unit 643 and a second sigma unit 644. The sigma block 654 can calculate intermediate values that can be passed to the adder block 656. For example, the first sigma unit 643 can receive the output of the register 612 and pass the result to a first carry-save adder 646 of the adder block 656. The second sigma unit 644 can receive the output of register 636 and pass the result to a second carry-save adder 648 (second CSA 648) of the adder block 656. Other configurations can be used to optimize performance and reduce power requirements.

Adder block 656 can be implemented in a variety of ways. In one embodiment, the adder block 656 can include the first carry-save adder 646, the second CSA 648, and a carry-propagate adder 650. However, the adder block 656 can be configured with other combination of adder types. The type of adders used can be varied to optimize the functionality of the adder block 656. For example, adder block 656 can be configured to minimize a critical path for data passing through the adder block 656 to reduce the amount of time and energy needed to perform the operations.

The expander unit 602 can be configured in a variety of ways. In some embodiments, the expander unit 602 and the components can be configured to increase effective hash rate, reduce power consumption, increase performance, or reduce the surface area of the electric circuit on the integrated circuit. Different components can be configured using different techniques to improve the overall effective hash rate of the ASIC.

In some embodiments, the expander unit 602 can be driven at a clock signal 666 at a clock frequency 664. The clock signal 666 can be provided by a phased lock loop unit 653 (PLL 653) that can vary the frequency as needed. The clock signal 666 can be coupled to the electrical components of the expander unit 602 to control the operation of the expander unit 602.

In some embodiments, the configuration of the expander unit 602 can include an expander critical path 668. An expander critical path 668 can be the route through the expander unit 602 with the lowest total delay which can be the sum of the individual delays 670 of each of the components in the expander critical path 668.

Different configurations of the expander unit 602 can change the expander critical path 668. This can be done by optimizing individual components, such as reducing the delay associated with a type of adder. In an example, the expander critical path 668 can be configured as the delays of each of the first sigma unit 643, the first CSA 646, the second CSA 648, the CPA 650, and the multiplexer unit 642. The design of the expander unit 602 can be improved by reducing the amount of the delay 670 for any of the components.

Figure 7:
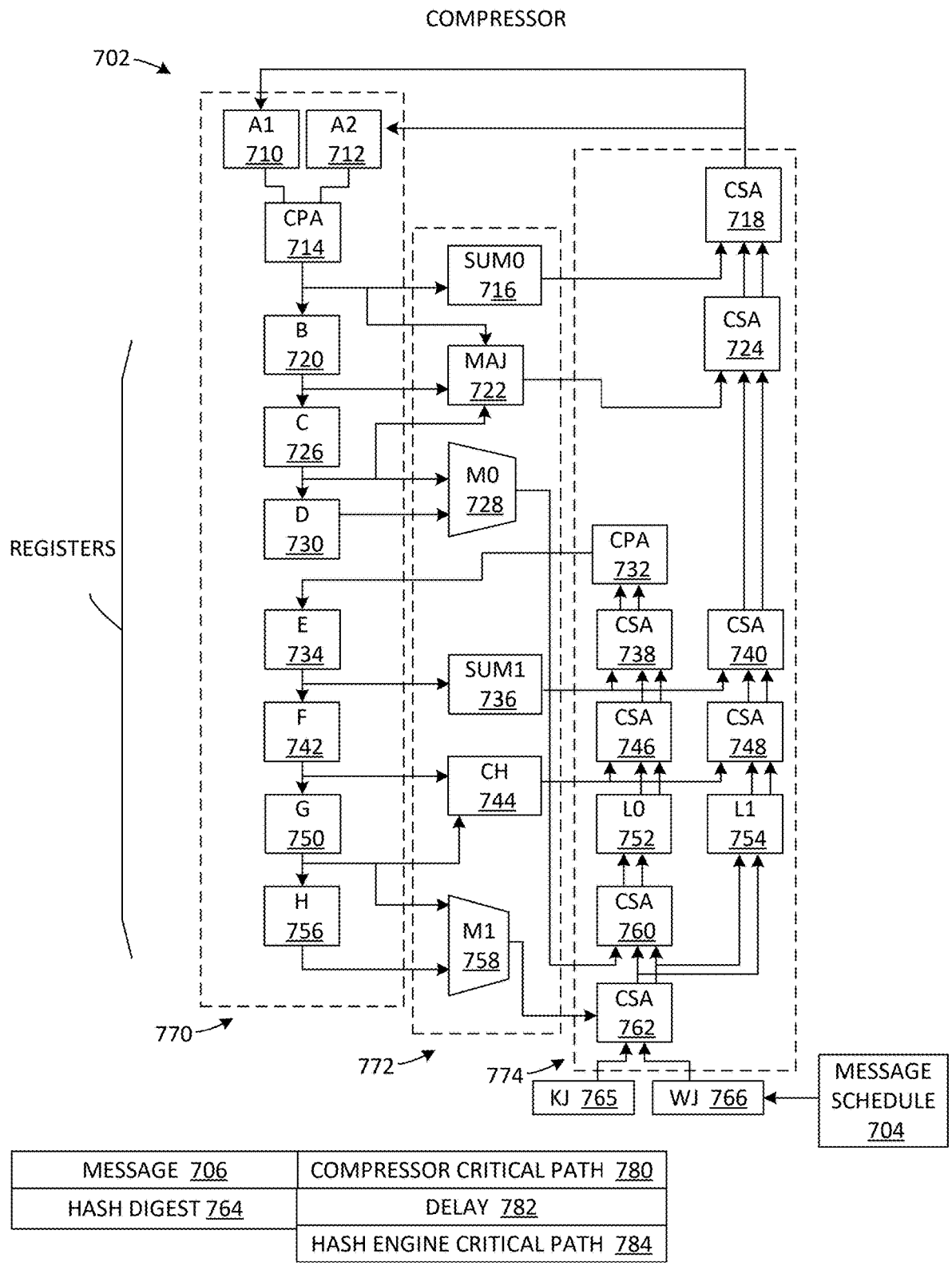
FIG. 7 depicts an example embodiment of a compressor unit.

FIG. 7 illustrates an example embodiment of a compressor unit 702. The compressor unit 702 is a circuit for receiving the message schedule 704 and calculating a hash value.

The compressor unit 702 implements a Message Compressor (MC) functionality. Compressor unit 702 can receive a message schedule 704 from the expander unit 702. For example, the message schedule 704 can be 74 chunks of 32-bit data generated using a message 706.

The compressor unit 702 can include a register block 770, a function block 772, and an adder block 774. The register block 770 can buffer data for calculating a hash digest 764. In an example, the hash digest 764 can be calculated as the addition of A1+A2, B, C, D, E, F, G, and H.

The register block 770 can include multiple registers for temporarily buffering data. The registers can include register A1 710, register A2 712, register B 720, register C 726, register D 730, register E 734, register F 742, register G 750, and register H 756.

In some embodiments, function block 772 can include a variety of functional units. The function block 772 can include a first sum unit 716, a majority unit 722, a first multiplexer unit 728, a second sum unit 736, a choose unit 744, and a second multiplexer unit 758.

The first sum unit 716 can receive the output of the first CPA unit 714. The first sum unit 716 can pass the output to the first CSA unit 718 of the adder block 774.

The majority unit 722 can have three binary inputs and output a result bit that represents the majority value of the three inputs. In some embodiments, the majority unit 722 can receive inputs from the CPA unit 714, the register B 720 and the register C 726. The output of the majority unit 722 can be passed to the second CSA unit 724.

The first multiplexer unit 728 can receive inputs from the register C 726 and the register D 730. The output of the first multiplexer unit 728 can pass the output to the seventh CSA unit 760.

The second sum unit 736 can receive the output of the register E 734. The result of the second sum unit 736 can be passed to a third CSA unit 738 and the fourth CSA unit 740.

The choose unit 744 can receive inputs from the register F 742 and the register G 750. The output of the choose unit 744 can be passed to the fifth CSA unit 746 and a sixth CSA unit 748.

The second multiplexer unit 758 can receive inputs from the register G 750 and the register H 756. The output of the second multiplexer unit 758 can be passed to the eighth CSA unit 762.

The adder block 774 can add the results of various stages and feedback to the register block 770. The adder block 774 can include a first CSA unit 718, a second CSA unit 724, the third CSA unit 738, a fourth CSA unit 740, a fifth CSA unit 746, the sixth CSA unit 748, a seventh CSA unit 760, a second CPA unit 732, a first register L 752, and a second register L 754.

The first CSA 718 can receive inputs from the first sum unit 716, and two inputs from the second CSA 724. The output of the first CSA 718 can be passed to the register A1 710 and the register A2 712.

The second CSA unit 724 can receive inputs from the majority unit 722 and two inputs from the fourth CSA unit 740. The two outputs of the second CSA unit 724 can be passed to the first CSA unit 718.

The second CPA unit 732 can receive inputs from the third CSA unit 738. The second CPA unit 732 can pass the results to the register E 734.

The third CSA unit 738 can receive inputs from the second sum unit 736 and two inputs from the fifth CSA unit 746. The two outputs of the third CSA unit 738 can be passed to the second CPA unit 732.

The fourth CSA unit 740 can receive input from the second sum unit 736 and two inputs from the sixth CSA unit 748. The two outputs of the fourth CSA unit 740 can be passed to the second CSA unit 724.

The fifth CSA unit 746 can receive inputs from the choose unit 744 and two inputs from the first register L 752. The output of the fifth CSA unit 746 can be passed to the third CSA unit 738.

The sixth CSA unit 748 ca receive input from the choose unit 744 and two inputs from the eighth CSA unit 762. The output of the sixth CSA unit 748 can be passed to the fourth CSA unit 740.

The first register L 752 can receive two inputs from the seventh CSA unit 760. The outputs from the first register L 752 can be passed to the fifth CSA 746.

The second register L 754 can receive two inputs from the eighth CSA unit 762. The output of the second register L 754 can be passed to the sixth CSA unit 748.

The seventh CSA unit 760 can receive inputs from the first multiplexer unit 728 and two inputs from the eighth CSA unit 762. The output of the seventh CSA unit 760 can be passed to the first register L 752.

The eighth CSA unit 762 can receive inputs including a hashing constant 765 (Kj), a register variable 766 (Wej) and the message schedule 704 from the expander unit 702. The output of the eighth CSA unit 762 can be passed to the seventh CSA unit 760.

The compressor unit 702 can be formed in a variety of ways. The example register block 770, function block 772, and the adder block 774 can be configured in different ways. The configuration can include combinations of carry-save adders, full-adders, carryOpropogate adders, ripple-carry adders, carry-lookahead adders, or other types of adder circuitry. Each type of adder can be configured to have different optimization factors including power, performance, surface area, and effective hash rate. Further the adders within the adder block 774 can have different connections to accommodate the data flow as needed.

In some embodiments, the compressor unit 702 can be driven at the clock signal 666 at the clock frequency 664. The clock signal 666 can be provided by the phased lock loop unit 653 that can vary the frequency as needed. The clock signal 666 can be coupled to the electrical components of the compressor unit 702 to control the operation of the compressor 702.

Each of the components of the compressor 702 can have a delay 782 associated with normal operation. The delay 782 can be expressed as the number of clock cycles required to generate an output based on the inputs.

In some embodiments, the configuration of the compressor unit 702 can include a compressor critical path 780. The compressor critical path 780 can be the route through the compressor unit 702 with the lowest total delay which can be the sum of the individual delays 782 of each of the components in the compressor critical path 780.

Different configurations of the compressor 702 can change the compressor critical path 780. This can be done by optimizing individual components, such as reducing the delay associated with a type of adder. In an example, the compressor critical path 780 can be configured as the delays of each of the CSA 762, the second register L 574, the sixth CSA 748, the fourth CSA 740, the second CSA 724, and the first CSA 718. The design of the compressor unit 702 can be improved by reducing the amount of the delay 782 for any of the components. In addition to the expander critical path 668 and the compressor critical path 780, there is a hash engine critical path 784 which can represent the critical path through both the expander unit 602 and the compressor unit 702.

In other embodiments, compressor unit 702 can be configured to operate at different voltage levels. The components of the compressor unit 702 can be coupled to a common power source or can be powered on a group basis to provide different power levels to different components or sets of components. Configuring the compressor unit 702 to use different power levels can reduce the power consumption of the circuit. Similarly, the compressor unit 702 can be configured to use different power levels at different clock frequencies.

Figure 8:
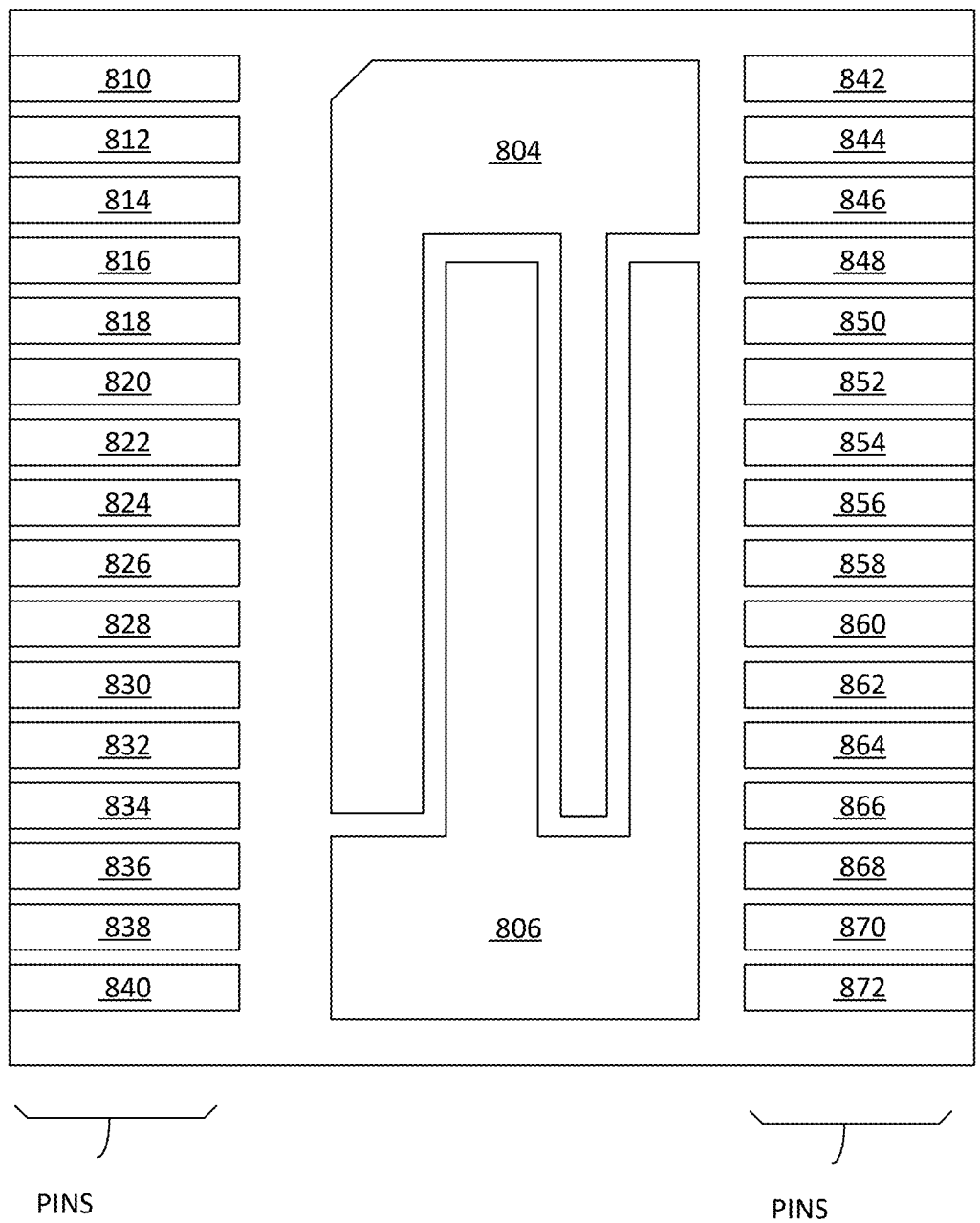
FIG. 8 depicts an example embodiment of an application specific integrated circuit chip.

FIG. 8 illustrates an example embodiment of an application specific integrated circuit chip 802 (ASIC 802). The ASIC 802 can be used to implement one or more of the hash engines. The ASIC 802 can have conductive pins to provide input and output signals as well as other pins for power and ground busses.

The ASIC 802 is an application specific integrated circuit designed to function as a set of high-performance hash engines. It can include internal circuitry customized to perform a variety of function such as cryptographic functions, logic function, arithmetic function, and other related functions.

The ASIC 802 can have a variety of configurations related to power and power distribution. In an embodiment, the ASIC 802 can have a source voltage trace 804, such as VDD_DLV, and a ground trace 806, such as VSS.

In some configurations, the ASIC 802 can have a set of identification pins to uniquely identify and address the hash engines of the ASIC 802. This can include ID [0] 810, ID [1] 812, ID [2] 814, and ID [3] 816. The ASIC 802 can have other identification pins including ID [7] 842, ID [6] 844, ID [5] 846, and ID [4] 848.

The ASIC 802 can have additional power and ground pins including a VSS1 pin 818, a VSS_IO pin 824, a VSS2 pin 850, VDD_SCV pin 820.

Th ASIC 802 can have a test pin 820, such as test_mode_i. The ASIC 802 can have a thermal trip reset output pin 822, such as thermal_trip_reset_n_o and a thermal trip reset input pin 854, such as thermal_trip_reset_n_i. The ASIC 802 can have a VDD_IO pin 824.

The ASIC 802 can have response pins including a response input command output pin 826, such as response_i_command_o and a response output command input pin 858, such as response_o_command_i. The response pins can transfer response information from the ASIC 802.

The ASIC 802 can have clock pins including a clock input output pin 828, such as clock_i_o and a clock output input pin 860, such as clock_o_i. The clock pins can be used to propagate clock signals.

The ASIC 802 can have command pins including a command input response output pin 832, such as command_i_response_o and a command output response input pin 864, such as command_o_response_i. The command pins can be used to propagate command signals.

The ASIC 802 can have other power pins such as a VDD_IO pin 830, a VDD_IO pin 836. The ASIC 802 can have a VDD_SCV pin 838. The ASIC 802 can have a VDD_IO pin 840.

The ASIC 802 can have other test pins. For example, the ASIC 802 can have a test clockout output pin 852.

The ASIC 802 can have thermal trip related pins including a thermal trip output reset pin 854, such as thermal_trip_o_reset_n_i. The ASIC 802 can have a reset thermal trip output pin 854, such as reset_n_i_thermal_trip_o, and a reset thermal trip input pin 866, such as reset_n_o_thermal_trip_i.

The ASIC 802 can have a response output command input pin 858, such as response_o_command_i. The ASIC 802 can have a command output response input pin 864, such as command_o_response_i.

The ASIC 802 can have power pins including a VDD_IO pin 856 and a VDD_IO pin 862. The ASIC 802 can have a VDD_IO pin 868. The ASIC 802 can have a VDD_SCV pin 870. The ASIC 802 can have a VDD_IO pin 872.

The pinout of the ASIC 802 shows how the internal circuitry can receive and distribute power and communication signals. The ASIC 802 can be combined with other ASIC 802 to form a multi-unit configuration with each of the ASIC 802 communicating with other similar chips.

The ASIC 802 can be configured to operate together with other ASIC 802 chips in a variety of ways. The ASIC 802 can operate in an array configuration, in a daisy-chain configuration, or a combination thereof.

Figure 9:
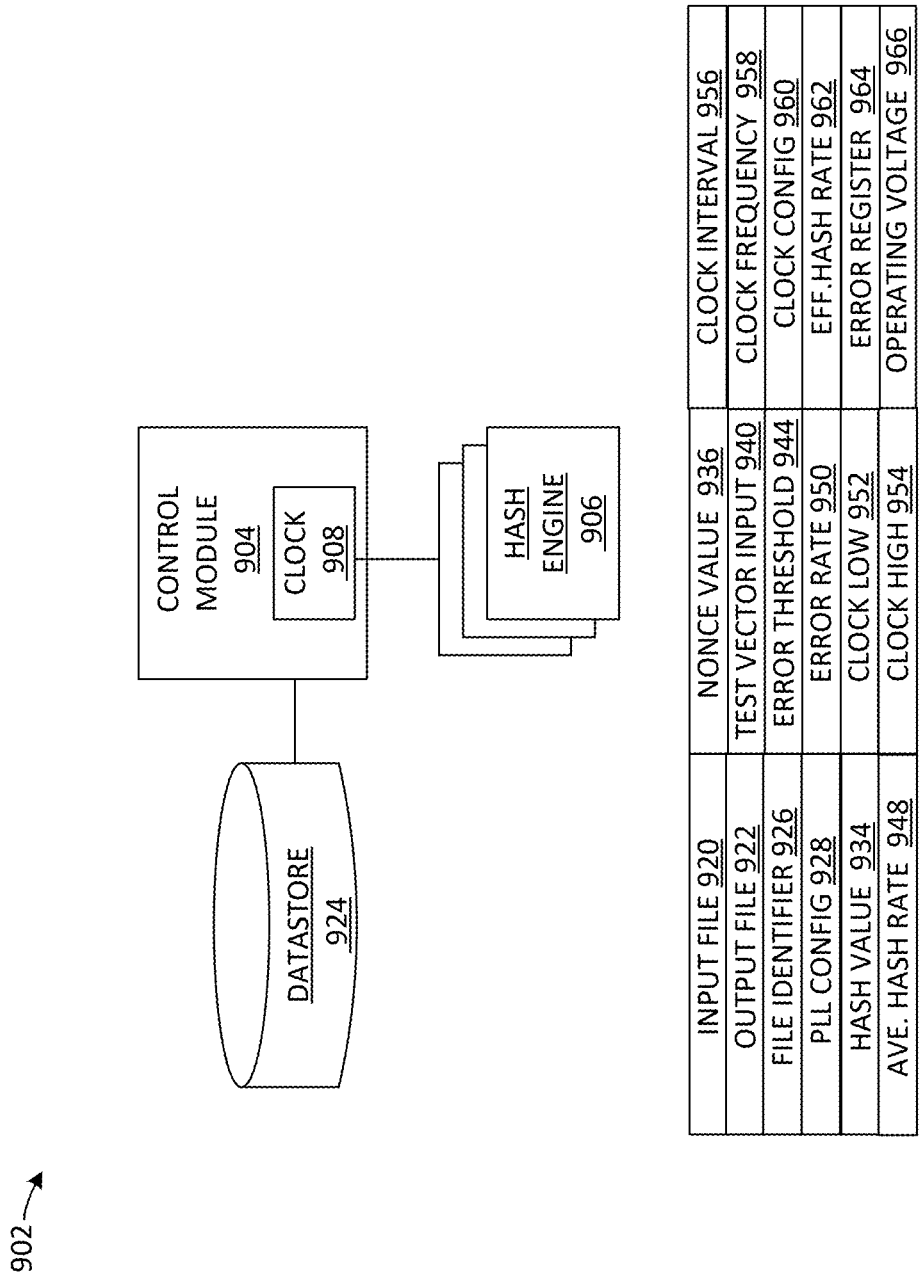
FIG. 9 depicts an example embodiment of digital currency mining system.

FIG. 9 illustrates an example embodiment of a digital currency mining system 902. The digital currency mining system 902 can have a plurality of hash engines 906 to calculate a hash value 934 based on the nonce value 936.

The digital currency mining system 902 can have a variety of configurations. In some embodiments, the digital currency mining system 902 can include automation components that can evaluate overclocking cases where the hash engines 906 can be overclocked and operated at a higher clock frequency, even when the overclocked operation of the hash engines 906 can result in some calculation errors, as long as the error rate 950 is below a predefined threshold limit.

In various embodiments, the digital currency mining system 902 can include different components. The digital currency mining system 902 can include a control module 904, a set of hash engines 906, and a clock unit 908. For example, the control module 904 can be implemented using a controller or similar device.

The control module 904 can control the overall operation of the digital currency mining system 902. This can include retrieving one or more input files 920 from a datastore 924, controlling test and data flow, and storing intermediate results in the datastore 924. Final results can be stored in an output file 922. The input file 920 can have a file identifier 926.

The input file 920 can store the test data that can be in a constrained range of values to focus on specific test conditions. The test values can be constrained in different ways.

In one embodiment, the test data can have a uniform random distribution. This allows coverage of a specific range when evaluating the performance of the system. This can allow for testing of the longest data path through test circuit 924.

In another embodiment, test vector inputs 940 can be configured to test for a specific workload type and focus on known inputs. These test vector inputs 940 can be varied and generated on an individual basis or generated programmatically as in a Monte Carlo analysis dataset. The test vector input 940 can be configured to be a random distribution of test data, specific data tailored to exercise specific portions of the test circuit 924, or other similar test configurations.

In some embodiments, the control module 904 can include hardware, software, or a combination thereof. The control module 904 can include a user interface, data storage units, memory units, display unit, communication units, and other similar units.

The control module 904 can retrieve one or more of the input files 920 from the datastore 924. The datastore 924 can be implemented in a variety of ways. The datastore 924 can be a relational database, a non-relational database, a text file, a binary file, a data chip, or a combination thereof.

The effective hash rate 962 of the hash engines 906 can be determined in a variety of ways. In some embodiments, the effective hash rate 962 can be determined using the hash engines 906 for a given design and energy consumed for that hash rate by doing a binary search on the clock frequency 958 for which a design operates with an acceptable value of an error rate or tolerable number of errors, such as when the error rate 950 is less than an error threshold 944. The error threshold 944 can be predefined or calculated dynamically. In some cases, the error threshold 944 within a statistical confidence interval is used. Different designs are presented in different input files 920 to the simulation engine 906 and the resulting PPA or effective hash rate 962 as measured by that flow are compared to choose the best design embodied in the input files 920.

In other embodiments, the effective hash rate 962 can be calculated by using the simulation data of one or more of the hash engines as they process the test vector input 940. One example of calculating the effective hash rate 962 is determining the individual hash rate for one hash value for one of the hash engines and multiply by the total number of hash engines in the ASIC.

Another example of calculating the effective hash rate 962 is to simulate a given number of the hash engines and calculate the effective hash rate 962 as an average of the total number of the individual hash rates being simulated and multiplying an average hash rate 948 by the total number of hash engines being simulated.

In some embodiments, one of the hash engines 906 can use a test vector input file 940 having different block headers. The test vector input file 940 can have a data set including multiple values for the block headers 92. The simulation run can process each of the test values in the test vector input file 940 while varying the clock frequency 958. At different test settings, the simulation run can detect errors in circuit operations. These errors can include checksum errors, data errors, timing errors, or other types of errors. During the simulation, the system can calculate an error rate 950 for a particular input file 920 operating at the clock frequency 958 and the operating voltage 966.

The error rate 950 can be compared to an error threshold 944, such as a predefined error threshold including a statistical confidence interval, absolute threshold, or other similar threshold techniques. If the error rate 950 is less than or equal to the error threshold 944 for a particular clock frequency 958, then the hash engine 906 can be flagged as operational, otherwise it can be flagged as not passing the test criteria.

The error rate 950 can be calculated in a variety of ways. In some embodiments, the system 902 can include error registers 964. The error registers 964 can be used to monitor the number of errors in the system.

In some embodiments, the hash engines 906 can evaluate operation at different clock frequencies, such as in an overclocking configuration. The input file 920 can include system timing parameters and test parameters including a clock frequency 958, a low clock threshold 952, a high clock threshold 954, a clock interval 956, and a clock configuration file 960. In another embodiment, the hash engines 906 can be evaluated at different clock frequencies ranging between the low clock threshold 952 and the high clock threshold 954 at frequencies separated by the clock interval 956. In yet other embodiments, the hash engines 906 can calculate the effective hash rate 962 at a given set of clock frequencies 944.

In some embodiments, the hash engines 906 can be coupled to a clock subsystem that can be a configurable frequency clock, such as a clock implemented using a phase locked loop (PLL) circuit. The PLL circuit can be configured to operate at a pre-defined frequency, dynamically updated frequencies, or a combination thereof. The configuration information for the PLL can be stored in a PLL configuration data 928. The PLL configuration data 928 can be implemented as a file, data structure, registers, or other data storage structure.

Figure 10:
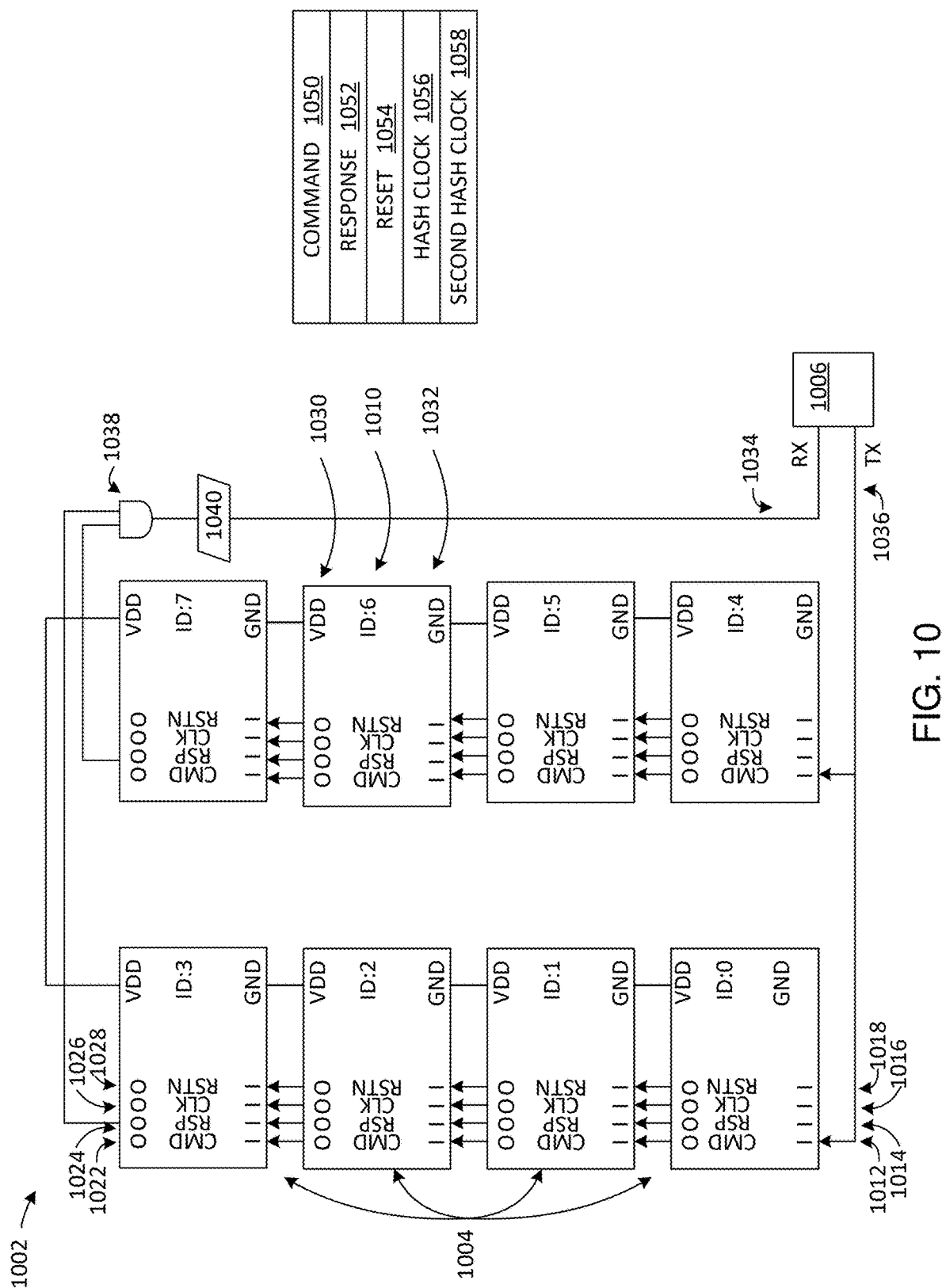
FIG. 10 depicts an example embodiment of a hash engine system.

FIG. 10 illustrates an example embodiment of a hash engine system 1002. The hash engine system 1002 can couple together a set of the hash engines 1004 to a controller 1006. The hash engines 1004 can be configured as one or more integrated circuits, such as ASICs.

In some embodiments, each the hash engines 1004 can have a set of control and data connections. The connections can include a set of inputs and a set of outputs. In some configurations, the input and outputs can be serial signals to allow the propagation of information to other units of the hash engines 1004.

The hash engines 1004 can have a variety of configurations. For example, the hash engines 1004 can be configured with four inputs for a command input 1012, a response input 1014, a hash clock input 1016, and reset input 1018. The hash engines 1004 can be configured to have associated output including a command output 1022, a response output 1024, a hash clock output 1026, and a reset output 1028. The command input 1012 can carry a command 1050. The response output 1024 can carry a response 1052.

The hash engines 1004 can include a hash engine identifier 1010. Each of the hash engines 1004 can have a unique identifier. For example, one of the hash engines 1004 can have the hash identifier of 4. Commands can be targeted at a particular one of the hash engines 1004 based on the hash engine identifier 1010.

The hash engines 1004 can each have a hash operating voltage input 1030 and a ground input 1032. The hash operating voltage input 1030 can be different than the operating voltage of other system components, such as the controller.

The command input 1012 can be used to receive command information propagated to the hash engines 1004 from the controller 1006. The command input 1012 can be coupled to the command output 1022 to allow passing the command information to other ones of the hash engines 1004.

The response input 1014 can be used to receive response information from the controller or other hash engines 1004. The response input 1014 can be coupled to the response output 1024 to allow sending the response information to other ones of the hash engines 1004.

The hash clock input 1016 can be used to receive the hash clock signal that can be used to drive each of the hash engines 1004. The hash clock input 1016 can be coupled to the hour clock output 1026 to allow sending the hash clock signal to other ones of the hash engines 1004. In some embodiments, the system can include a second hash clock 1058.

The hash clock input 1016 of the hash engines 1004 can be configured in a variety of ways. In some embodiments, all of the hash engines 1004 can share the hash clock.

The reset input 1018 can be used to receive a reset signal from the controller 1006 or other hash engines 1004. The reset input 1018 can be coupled to the reset output 1028 to allow sending the reset signal to other ones of the hash engines 1004. The reset input 1018 can be configured to receive the reset signal 1054 directly from the controller 1006, from another one of the hash engines 1004, or as part of a subset of the hash engines 1004.

The controller 1006 can control the hash engines 1004 by sending commands along a command bus 1036 which is coupled to the command input 1012 of the hash engines 1004. The command bus 1036 can support serial communication, such as RS-232 or other serial formats.

The command bus 1036 can be configured in a variety of ways. For example, the command bus 1036 can be directly coupled to the command input 1012 of each of the hash engines 1004, in a daisy chain configuration, or a combination thereof. In yet another example, the command bus 1036 can be coupled to subsets of the hash engines 1004 directly where the individual subsets of the hash engines 1004 can be coupled to one another in a daisy chain configuration. In a daisy chain configuration, the command input 1012 of one hash engines 1004 can be coupled to the command output 1022 of another one of the hash engines 1004 to support the propagation of the command information.

The controller 1006 can receive the response information from the hash engines 1004 via a receiver bus 1034. The receiver bus 1034 can be coupled to the response output 1024 of the hash engines 1004. In an example, the hash engine 1004 that is first in a chain can have the response input 1014 set to high if there are an even number of chips or low if otherwise.

In other embodiments, the array of the hash engines 1004 can be configured to operate at different frequencies of the hash clock 1056. For example, the hash engines 1004 can be partitioned into subsets having rows or adjacent blocks of the hash engines 1004 and each subset operated at a different frequency of the hash clock 1056, such as a first hash clock or a second hash clock. The controller 1006 or a similar element can track the error performance of each of the hash engines 1004 and adjust the clock frequency to overclock the hash engines 1004 to balance error performance and effective hash rate.

This can allow each of the hash engines 1004 to operate at maximum performance. The performance can be influenced by environmental factors such as physical location relative to other hash engines or other components, local cooling level, local physical heat conduction performance, individual operating voltage, and other similar factors.

In some embodiments, the response output 1024 from two or more of the columns of the hash engines 1004 can be combined using a logic gate 1038, such as an AND gate to generate a response signal that is coupled to the receiver bus 1034 of the controller 1006. In some configurations, the output of the logic gate 1038 can be coupled to an optoisolator 1040 to improve signal quality.

Figure 11:
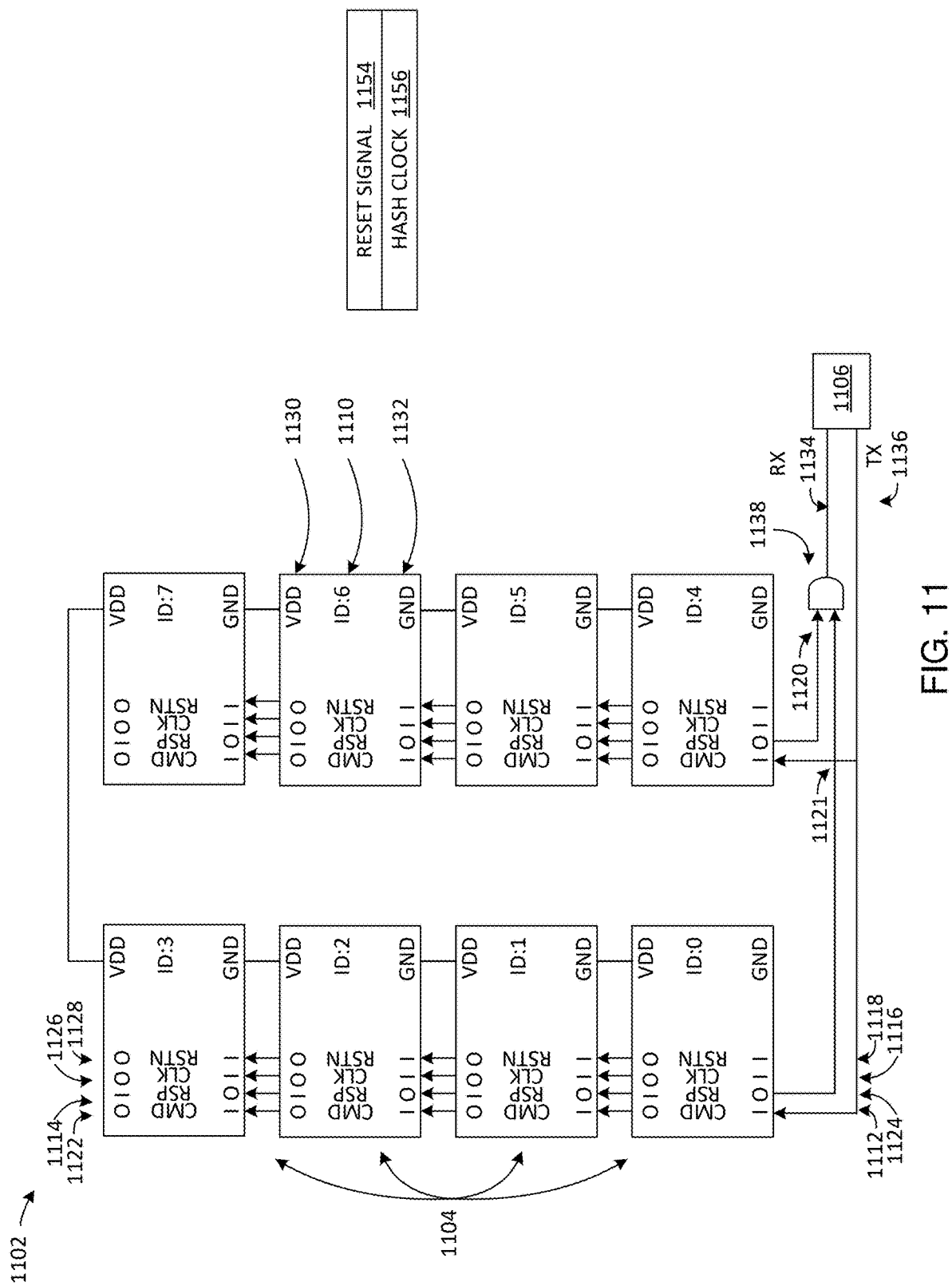
FIG. 11 depicts an example embodiment of another hash engine system.

FIG. 11 illustrates an example embodiment of another hash engine system 1102. The hash engine system 1102 can couple together a set of the hash engines 1104 to a controller 1106. The hash engines 1104 can be configured as one or more integrated circuits, such as ASICS.

In some embodiments, each the hash engines 1104 can each have a set of control and data connections. The connections can include a set of inputs and a set of outputs. In some configurations, the input and outputs can be serial signals to allow the propagation of information to other units of the hash engines 1104.

The hash engines 1104 can have a variety of configurations. For example, the hash engines 1104 can be configured with four inputs for a command input 1112, a response input 1114, a hash clock input 1116, and reset input 1118. The hash engines 1104 can be configured to have associated output including a command output 1122, a response output 1124, a hash clock output 1126, and a reset output 1128.

The hash engines 1104 can include a hash engine identifier 1110. Each of the hash engines 1104 can have a unique identifier. For example, one of the hash engines 1104 can have the hash identifier of 4. Commands can be targeted at a particular one of the hash engines 1104 based on the hash engine identifier 1110.

The hash engines 1104 can each have a hash operating voltage input 1130 and a ground input 1132. The hash operating voltage input 1130 can be different than the operating voltage of other system components, such as the controller.

The command input 1112 can be used to receive command information propagated to the hash engines 1104 from the controller 1106. The command input 1112 can be coupled to the command output 1122 to allow passing the command information to other ones of the hash engines 1104.

The response input 1114 can be used to receive response information from the controller or other hash engines 1104. The response input 1114 can be coupled to the response output 1124 to allow sending the response information to other ones of the hash engines 1104.

The hash clock input 1116 can be used to receive the hash clock signal that can be used to drive each of the hash engines 1104. The hash clock input 1116 can be coupled to the hour clock output 1126 to allow sending the hash clock signal to other ones of the hash engines 1104.

The hash clock input 1116 of the hash engines 1104 can be configured in a variety of ways. In some embodiments, all of the hash engines 1104 can share the hash clock.

The reset input 1118 can be used to receive a reset signal from the controller 1106 or other hash engines 1104. The reset input 1118 can be coupled to the reset output 1128 to allow sending the reset signal to other ones of the hash engines 1104. The reset input 1118 can be configured to receive the reset signal 1154 directly from the controller 1106, from another one of the hash engines 1104, or as part of a subset of the hash engines 1104.

The controller 1106 can control the hash engines 1104 by sending commands along a command bus 1136 which is coupled to the command input 1112 of the hash engines 1104. The command bus 1136 can support serial communication, such as RS-232 or other serial formats.

The command bus 1136 can be configured in a variety of ways. For example, the command bus 1136 can be directly coupled to the command input 1112 of each of the hash engines 1104, in a daisy chain configuration, or a combination thereof. In yet another example, the command bus 1136 can be coupled to subsets of the hash engines 1104 directly where the individual subsets of the hash engines 1104 can be coupled to one another in a daisy chain configuration. In a daisy chain configuration, the command input 1112 of one hash engines 1104 can be coupled to the command output 1122 of another one of the hash engines 1104 to support the propagation of the command information.

The controller 1106 can receive the response information from the hash engines 1104 via a response bus 1134. The response bus 1134 can be coupled to the response output 1124 of the hash engines 1104. In an example, the hash engine 1104 that is first in a chain can have the response input 1114 set to high if there are an even number of chips or low if otherwise.

In other embodiments, the array of the hash engines 1104 can be configured to operate at different frequencies of the hash clock 1156. For example, the hash engines 1104 can be partitioned into subsets having rows or adjacent blocks of the hash engines 1104 and each subset operated at a different frequency of the hash clock 1156, such as a first hash clock or a second hash clock. The controller 1106 or a similar element can track the error performance of each of the hash engines 1104 and adjust the clock frequency to overclock the hash engines 1104 to balance error performance and effective hash rate.

This can allow each of the hash engines 1104 to operate at maximum performance. The performance can be influenced by environmental factors such as physical location relative to other hash engines or other components, local cooling level, local physical heat conduction performance, individual operating voltage, and other similar factors.

In some embodiments, the response output 1124 from two or more of the columns of the hash engines 1104 can flow down a chain of the hash engines 1104 and be combined using a logic gate 1138, such as an AND gate, with the response output 1124 of another column to generate a response signal on the response bus 1134 that is coupled to the controller 1106. In one example, the response output 1124 can include a first response 1120 and a second response output 1121. The configuration can reduce the number of components but can require additional IO level shifting characterization.

Figure 12:
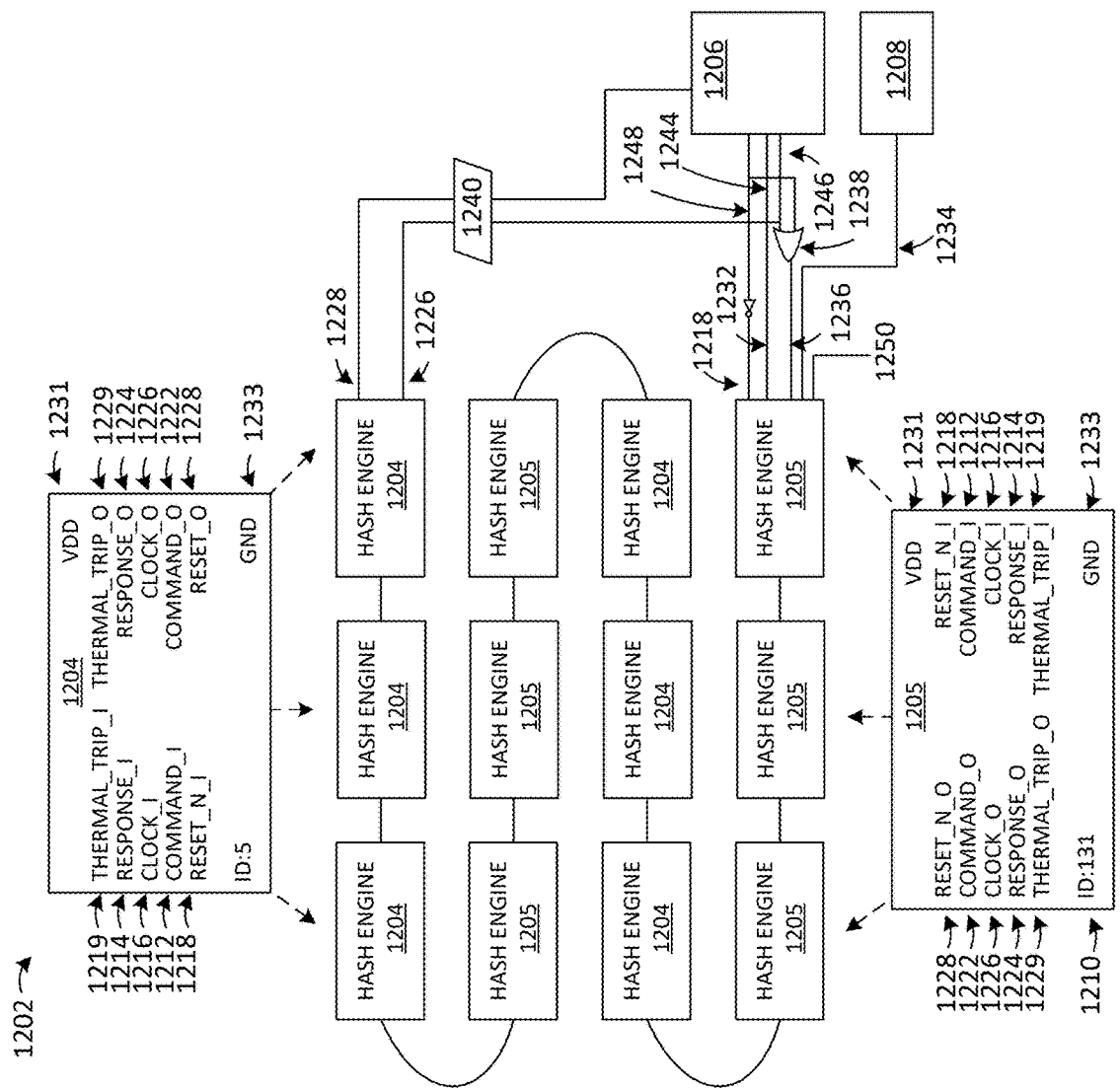
FIG. 12 depicts an example embodiment of a hash engine system.

FIG. 12 illustrates an example embodiment of a hash engine system 1202 with hardware collision avoidance. The hash engine system 1202 can couple together a set of the hash engines 1204 to a controller 1206 and to an oscillator 1208.

In some embodiments, each the hash engines 1204 can each have a set of control and data connections. The connections can include a set of inputs and a set of outputs. In some configurations, the input and outputs can be serial signals to allow the propagation of information to other units of the hash engines 1204.

The hash engines 1204 can have a variety of configurations. For example, the hash engines 1204 can be configured with four inputs for a command input 1212, a response input 1214, a hash clock input 1216, a reset input 1218, and a thermal trip input 1219. The thermal trip input 1219 on the first of the hash engines 1204 can be tied to a ground 1250. The hash engines 1204 can be configured to have associated output including a command output 1222, a response output 1224, a hash clock output 1226, a reset output 1228, and a thermal trip output 1229.

The hash engines 1204 can include a hash engine identifier 1210. Each of the hash engines 1204 can have a unique identifier. For example, one of the hash engines 1204 can have the hash identifier of 4 or another identifier. Commands can be targeted at a particular one of the hash engines 1204 based on the hash engine identifier 1210.

The hash engines 1204 can each have a hash operating voltage input 1231 and a ground input 1233. The hash operating voltage input 1231 can be different than the operating voltage of other system components, such as the controller.

In some embodiments, the response output 1224 from two or more of the hash engines 1204 can be combined using a logic gate 1238, such as an AND gate to generate a response signal that is coupled to the receive line 1234 of the controller 1206. In some configurations, the output of the logic gate 1238 can be coupled to an optoisolator 1240 to improve signal quality.

The command input 1212 can be used to receive command information propagated to the hash engines 1204 from the controller 1206. The command input 1212 can be coupled to the command output 1222 to allow passing the command information to other ones of the hash engines 1204.

The response input 1214 can be used to receive response information from the controller or other hash engines 1204. The response input 1214 can be coupled to the response output 1224 to allow sending the response information to other ones of the hash engines 1204.

The hash clock input 1216 can be used to receive the clock signal that can be used to drive each of the hash engines 1204. The hash clock input 1216 can be coupled to the hour clock output 1226 to allow sending the hash clock signal to other ones of the hash engines 1204.

The reset input 1218 can be used to receive a reset signal from the controller 1206 or other hash engines 1204. The reset input 1218 can be coupled to the reset output 1228 to allow sending the reset signal to other ones of the hash engines 1204.

The controller 1206 can control the hash engines 1204 by sending commands along a transmit line 1236 which is coupled to the command input 1212. The controller 1206 can receive the status information from the hash engine 1204. In some embodiments, the controller 1206 can be coupled to the reset input 1218 and the command input 1212.

The controller 1206 can generate and receive signal information using a receiver bus 1244, a transmission bus 1246, and a reset line 1248. The receiver bus 1244 can receive responses from the hash engines 1204. The transmission bus 1246 can transfer command information to the hash engines 1204. The reset line 1248 can transfer reset signals to the hash engines 1204. The hash engines 1204 can be coupled to the controller 1206 via the thermal trip output 1229. The command output 1222 can be coupled to the logic gate 1238.

The oscillator 1208 can generate a clock signal used to operate the hash engines 1204. The oscillator 1208 can have a variety of configurations. For example, the oscillator 1208 can include a voltage-controlled oscillator, a phase lock loop unit, or a combination thereof. In some embodiments, the oscillator 1208 can generate a clock signal at specific frequencies based on parameter settings.

3.0. Functional Overview

Figure 13:
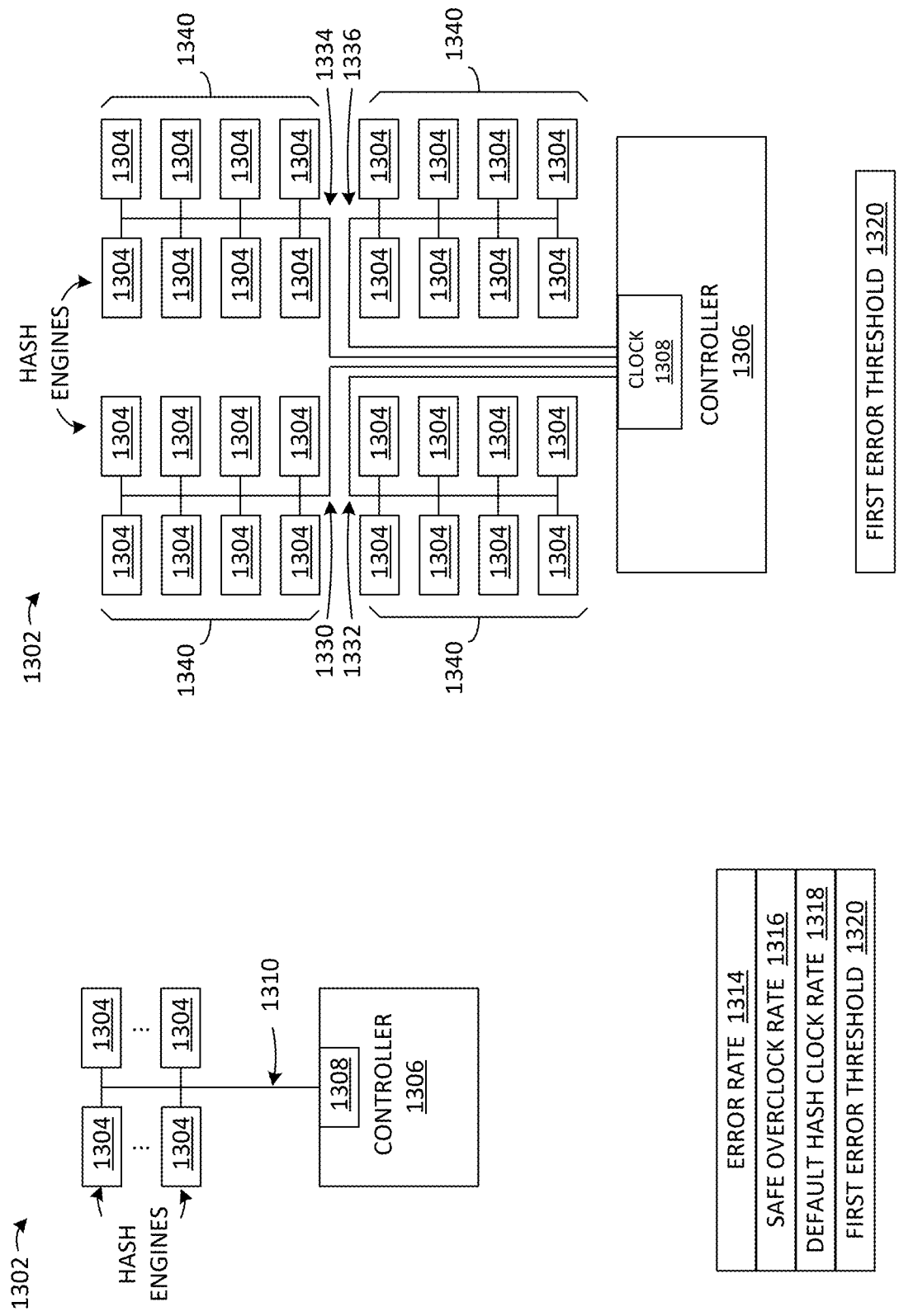
FIG. 13A depicts an example embodiment of a hash engine array.
FIG. 13B depicts an example embodiment of the hash engine array.

FIG. 13A illustrates an example embodiment of a hash engine array 1302. The hash engine array 1302 can include a controller 1306 and a clock unit 1308 coupled to an array of one or more of the hash engines 1304.

In some embodiments, the controller 1306 can configure the clock unit 1308 to send a hash clock 1310 to the hash engines 1304. The hash clock 1310 can be used to drive the calculation of the hash engines 1304. For example, the clock unit 1308 can include a phase lock loop component, a voltage-controlled oscillator unit, or a combination thereof.

The hash engines 1304 can be driven at different frequencies of the hash clock 1310. The hash engines 1304 can have a default hash clock rate 1318 where the hash engines 1304 can operate with complete accuracy and an error rate 1314 of zero.

In other embodiments, the hash engines 1304 can be overclocked and operated at a higher clock frequency, but the hash engines 1304 still operate with complete accuracy and with the error rate 1314 of zero. The hash clock 1310 can be overlocked at a higher frequency above the default frequency of operation. This can be represented by a safe overclock rate 1316. For example, the safe overclock rate 1316 can be 10-20% higher than the default hash clock rate 1318. In still other embodiments, the safe overclock rate 1316 can be up to 50% faster than the default hash clock rate 1318.

In another embodiment, the hash engines 1304 can be overclocked and operate with less than complete accuracy and have the error rate 1314 less than a first error threshold 1320. The hash engines 1304 can operate independently of the rest of the hash engines 1304 and each can report an individual error rate. The first error threshold 1320 can be a predefined level of errors that can represent an acceptable error rate. The system can operate where the error rate of each of the hash engines 1304 is less than or equal to the first error threshold 1320.

In an embodiment, the hash engine array 1302 can operate in an overclocking mode by increasing the clock frequency of the clock unit 1308 until one or more of the hash engines 1304 reports having the error rate above the first error threshold 1320. The system can operate at the higher clock speed and operate effectively as long as the error rate is below the first error threshold 1320. Because the hash engines 1304 can operate and calculate hash values independently, the system can operate in an acceptable fashion as long as the error rate is below the threshold.

FIG. 13B illustrates another example embodiment of the hash engine array 1302. The hash engine array 1302 can include the controller 1306 and a clock unit 1308 coupled to an array of one or more of the hash engines 1304. The hash engines 1304 can be partitioned into hash engine groups 1340. Each of the hash engine groups 1340 can include one or more of the hash engines 1304.

In some embodiments, each of the hash engine groups 1340, such as a first group, a second group, a third group, a fourth group, or similar groupings, can share a common hash clock, such as a first hash clock 1330, a second hash clock 1332, a third hash clock 1334, and a fourth hash clock 1336. Each of the hash engines 1304 in each of the hash engine groups 1340 can be coupled to the corresponding hash clock to allow each of the hash groups to operate using a different hash clock frequency.

The clock unit 1308 can have a variety of configurations. In some configurations, the clock unit 1308 can have a plurality of independent clock outputs, such as four separate clock lines coupled to four of the hash engine groups 1340. In other configurations, each of the four clock outputs can operate at the same clock frequency. In yet other configurations, two or more of the clock lines can operate at the same frequency and other ones of the clock lines can operate at a different frequency. This can allow each of the hash engine groups 1340 to operate at the best clock frequency for maximum performance.

In an illustrative example, the system can first evaluate the performance of each of the hash engines 1304 by passing a predefined set of test data to each of the hash engines 1304 at different hash clock frequencies. This will generate a result that can be compared against the known correct values to determine how each of the hash engines 1304 performs at the different clock frequencies.

The system can then determine the lowest operational clock frequency for each of the hash engine blocks 1340 that allows the desired level of operation. For example, for safe operation, the system can set the hash clock frequency to the safe overclock rate or another rate that supports safe operation. In another example, if approximate operation is acceptable, the hash clock frequency can be set to an operational frequency that allows operation within the first error threshold 1320 for all of the hash engines 1304 of one of the hash engine groups 1340.

Figure 14:
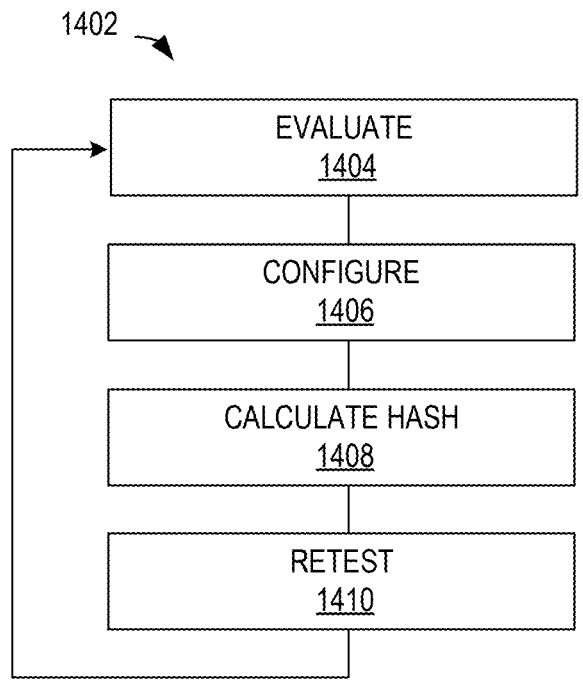
FIG. 14 depicts an example of an operation process flow for the electronic system in an embodiment.

FIG. 14 illustrates an example of an operational process flow 1402 for the electronic system 100 in an embodiment. The operational process flow 1402 can describe the steps and process for operating the electronic system 100.

The operational process flow 1402 can include a variety of steps. In an illustrative embodiment, the operational process flow 1402 can include an evaluate step 1404, a configure step 1406, a calculate hash step 1408, and a retest step 1410.

In the evaluate step 1404, the hash engines 1304 can be individually evaluated to determine the highest rate of the hash clock signal of the clock unit 1308 that results in an error rate 1442 for the hash engine being tested of the hash engines 1304 being less than or equal to the first error threshold 1320. Each of the hash engines 1304 being tested can be provided a test vector input 1430 that can be evaluated over at a test range 1432 of a hash clock frequency 1420.

The test vector input 1430 is a set of test data for evaluating the performance of the hash engines 1304. The test vector input 1430 can be associated a test vector result 1438 which is the expected correct result of the hash value calculated by the hash engine 1304 using one of the elements of the test vector input 1430. The test vector input 1430 can be configured to test one or more of the computational pathways of the hash engines 1304.

The test vector input 1430 can be a complex value having multiple values that can be used for testing the hash engines 1304. The test vector input 1430 and the test vector result 1438 can be stored in a variety of locations including register areas on the ASIC, memory areas coupled to the system, or other similar data storage areas.

The system can calculate a hash value 1434 for one of the elements of the test vector input 1430. Comparing the test vector result 1438 with the calculated hash value 1434 can determine if the hash value 1434 is correct or incorrect. A test status 1436 can be the result of comparing the two hash values can be a test status 1436. The test status 1436 can also include additional information such as the test frequency and other values.

The test range 1432 can have a variety of configurations. For example, the test range 1432 can include a set of test frequencies to evaluate, a minimum frequency and an incremental interval, a minimum and a maximum frequency values, or a combination thereof.

The system can calculate the test status 1436 for each of the hash engines 1304 and for each value of the hash clock frequency 1420. The resulting values can be stored in a data storage unit.

In some embodiments, only one characteristic value can be stored for each of the hash engines 1304, such as the highest frequency where the correct hash value 1434 was achieved. This can provide a list of the highest hash clock frequencies for each of the hash engines 1304.

In an embodiment, a group of the hash engines 1304 that share a common hash clock and one hash clock frequency can be operated at the lowest of the hash clock frequencies for the group. This results in operating the group of the hash engines 1304 at the hash clock frequency where all of the hash engines 1304 are operating with the error rate 1442 below the first error threshold 1320.

For example, the group of the hash engines 1304 can include all of the hash engines 1304, such as 254 hash engines 1304. In alternative configurations, the groups of the hash engines 1304 can divide the overall set of the hash engines 1304 into groups having one-half, one-quarter, one-sixth, one-eighth, or other sized groups. In addition, the groups of the hash engines 1304 can be asymmetrically sized such as one group that is one-half of the hash engines 1304 and two groups holding one-fourth of the hash engines 1304 each. Each of the groups can be coupled to a separate hash clock line and operate at different hash clock frequencies.

In the configure step 1406, the system can configure the system to operate the hash engines 1304 and the clock unit 1308 to operate at one or more of the hash clock frequencies 1420. Based on the results of the evaluate step 1404, the maximum operating frequency for operation at the first error threshold 1320 can be determined for the hash engines 1304.

For each of the hash engine groups 1340, the system can calculate the lowest frequency that can be used to generate the hash results within the desired error threshold. In some examples, there can be one single hash engine group 1340. In other embodiments, the set of all of the hash engines 1304 can be partitioned into any number of hash engine groups 1340 until each group has a single one of the hash engines 1304.

The clock unit 1308 can be configured in a variety of ways. For example, the controller 1306 can retrieve the hash clock frequency 1420 for each of the hash engine groups 1340 and configure the clock unit 1308 to generate those clock frequency 1420 for each of the corresponding hash engine groups 1340.

In some embodiments, the hash engines 1304 can all share a single hash clock 1310. This can be the case where all of the hash engines 1304 form a single group. The hash clock 1310 can drive all of the hash engines 1304 at the same overclocked rate that allows all of the hash engines 1304 to operate with the error rate 1442 less than or equal to the first error threshold 1320.

In other embodiments, the hash engines 1304 can be partitioned into hash engine groups 1340 with each hash engine group 1340 coupled to a separate hash clock 1310 at a separate frequency. The clock unit 1308 can be configured to have as many hash clock lines as there are hash engine groups 1340.

The clock unit 1308 can be configured to provide each of the hash engine groups 1340 with the appropriate one of the hash clock frequencies 1420.

Each of the hash engine groups 1340 can clock can be partitioned into groups based on the test status 1436 of each of the hash engines 1304. The test status 1436 can indicate the maximum clock speed that allows one of the hash engines 1304 to operate with the error rate 1442 less than or equal to the first error threshold 1320.

In some embodiments, the system can include a settings register 1452 associated with the chip hardware of the hash engines 1304, such as an ASIC. The settings register 1452 can be a complex data storage area capable of holding single values and complex data. The settings register 1452 can be used to store different data elements including the test vector input 1430, the test vector result 1438, hash values, or other similar elements.

In the calculate hash step 1408, the controller 1306 can retrieve and pass the data for each of the hash engines 1304 to use to calculate the hash value. Each of the hash engines 1304 can be operated individually, so the input data, such as the nonce inputs 515, can be sent to the hash engines 1304 over the command bus 1036 and the hash values 1434 calculated. The controller 1306 can be coupled to data storage devices that can be used as the source and repository of the data elements as needed. The controller 1306 can continue passing data elements to the hash engines 1304 as needed until the hashing process is complete.

In the retest step 1410, the controller 1306 can evaluate the data and error rates 1442 and decide to retest the hash engines 1304 to determine if the performance requires a reevaluation of the hash clock frequency 1420. The controller 1306 can evaluate one or more of the hash engines 1304 to determine if the error rates 1442 have increased such that the hash clock frequency 1420 needs to be adjusted. The reset step 1410 can pass the control flow back to the evaluate step 1404 to reevaluate the hash engines 1304.

Other examples of these and other embodiments are found throughout this disclosure.

4.0. Example Embodiments

Examples of some embodiments are represented, without limitation, in the following clauses and use cases:

According to an embodiment, a method of operation of an electronic system comprising calculating test hash results and a hashing error rate of one of a plurality of hash engines at each of a set of hash clock frequencies, identifying a target hash clock equal to the highest hash clock frequency having the hashing error rate less than or equal to a hash error threshold, configuring a clock unit to provide the target hash clock to the hash engines of a hash engine group having a plurality of the hash engines, receiving a block header having a nonce value of a block, and calculating a hash value of the block header with the hash engines operating at the target hash clock.

In an embodiment, the method further comprises comparing each of the test hash results with a predefined hash value for each of the hash clock frequencies in the clock range.

In an embodiment, the method further comprises operating the first hash engine at the target hash clock to calculate the first hash value for the first nonce.

In an embodiment, the method further comprises partitioning the hash engines into a first hash engine group and a second hash engine group, coupling the first hash engine group to a first hash clock, coupling the second hash engine group to a second hash clock line, and overclocking the first hash clock at a first hash clock frequency than the second hash clock.

In an embodiment, the method further comprises coupling a first hash clock to a first hash engine of a first hash engine group, and coupling the first hash clock of the first hash engine of the first hash engine group to a second hash engine of the first hash engine group in a daisy chain configuration.

In an embodiment, the method further comprises calculating the hash value as a SHA-256 value.

In an embodiment, the method further comprises retrieving the block header and the nonce value from a storage device.

According to an embodiment, an electronic system comprising a control unit coupled to a plurality of hash engines for calculating test hash results and a hashing error rate at each of a set of hash clock frequencies, identifying a target hash clock equal to the highest hash clock frequency having the hashing error rate less than or equal to a hash error threshold, and calculating a hash value of a block header with the plurality of the hash engines operating at the target hash clock, a clock unit configured to provide the target hash clock to the hash engines of a hash engine group, and a storage device, coupled to the plurality of the hash engines, for receiving the block header having a nonce value of a block.

In an embodiment, the system further comprises the control unit configured to compare each of the test hash results with a predefined hash value for each of the hash clock frequencies in the clock range.

In an embodiment, the system further comprises the plurality of the hash engines are configured to operate a first hash engine at the target hash clock to calculate a first hash value for a first nonce.

In an embodiment, the system further comprises the plurality of hash engines partitioned into a first hash engine group and a second hash engine group, the first hash engine group is coupled to a first hash clock, the second hash engine group is coupled to a second hash clock line, and the first hash clock at a first hash clock frequency than the second hash clock.

In an embodiment, the system further comprises a first hash clock coupled to a first hash engine of a first hash engine group and the first hash clock of the first hash engine of the first hash engine group coupled to a second hash engine of the first hash engine group in a daisy chain configuration.

In an embodiment, the system further comprises the plurality of the hash engines for calculating the hash value as a SHA-256 value.

In an embodiment, the system further comprises the plurality of the hash engines for retrieving the block header and the nonce value from a storage device.

According to an embodiment, one or more non-transitory computer-readable media storing instructions that, when executed by one or more computing devices, cause calculating test hash results and a hashing error rate of one of a plurality of hash engines at each of a set of hash clock frequencies, identifying a target hash clock equal to the highest hash clock frequency having the hashing error rate less than or equal to a hash error threshold, configuring a clock unit to provide the target hash clock to the hash engines of a hash engine group having a plurality of the hash engines, receiving a block header having a nonce value of a block, and calculating a hash value of the block header with the hash engines operating at the target hash clock.

In an embodiment, the non-transitory computer-readable media further comprises comparing each of the test hash results with a predefined hash value for each of the hash clock frequencies in the clock range.

In an embodiment, the non-transitory computer-readable media further comprises operating the first hash engine at the target hash clock to calculate the first hash value for the first nonce.

In an embodiment, the non-transitory computer-readable media further comprises partitioning the hash engines into a first hash engine group and a second hash engine group, coupling the first hash engine group to a first hash clock, coupling the second hash engine group to a second hash clock line, and overclocking the first hash clock at a first hash clock frequency than the second hash clock.

In an embodiment, the non-transitory computer-readable media further comprises coupling a first hash clock to a first hash engine of a first hash engine group, and coupling the first hash clock of the first hash engine of the first hash engine group to a second hash engine of the first hash engine group in a daisy chain configuration.

In an embodiment, the non-transitory computer-readable media further comprises calculating the hash value as a SHA-256 value.

In an embodiment, the system further comprises an expander for forming a message schedule of data from a first chunk of an initial message.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being coupled to various other components by arrows. These arrows illustrate only certain examples of current flows between or through the components. Neither the direction of the arrows nor the lack of arrow lines between certain components should be interpreted as indicating the existence or absence of a flow between the certain components themselves.

In the specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this system, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It is understood that the system functionality can be described using terms like module, unit, system, subsystem, pod, and component that represent devices that can be implemented using different combinations of mechanical and electronic elements. The systems and devices can include electric subsystems, mechanical subsystems, and other physical elements to operate and control the system. These elements can include computing elements that can execute the firmware and software of the system to control mechanical features of the system. In addition, the mechanical elements of the system can operate with or without control mechanisms in regular operation.

The invention claimed is:

1. A method of operation of a digital currency mining system comprising:
   calculating test hash results and a hashing error rate of each of a plurality of hash engines at each of a set of hash clock frequencies, each of the hash clock frequencies above a safe overclock rate wherein the safe overclock rate has the hashing error rate of zero;
   identifying a target hash clock frequency equal to a highest of the hash clock frequencies for each hash engine among the plurality of hash engines by comparing the hashing error rate to a hash error threshold, the hash error threshold greater than an acceptable error rate;
   configuring a phase locked loop (PLL) clock to provide the target hash clock frequency to the plurality of hash engines of a hash engine group;
   generating a block header having a nonce value of a block; and
   calculating a hash value of the block header with the plurality hash engines operating at the target hash clock frequency.

2. The method as claimed in claim 1, wherein calculating the test hash results includes comparing each of the test hash results with a hash value for each of the hash clock frequencies in a clock range and each of the hash clock frequencies at least 10% above the safe overclock rate.

3. The method as claimed in claim 1, wherein calculating the hash value includes operating a first hash engine at the target hash clock frequency to calculate a first hash value for a first nonce.

4. The method as claimed in claim 1, further comprising:
   partitioning the plurality of hash engines into a first hash engine group and a second hash engine group;
   coupling the first hash engine group to a first hash clock;
   coupling the second hash engine group to a second hash clock line; and
   overclocking the first hash clock at a first hash clock frequency different than the second hash clock.

5. The method as claimed in claim 1, further comprising:
   coupling a first hash clock to a first hash engine of a first hash engine group; and
   coupling the first hash clock of the first hash engine of the first hash engine group to a second hash engine of the first hash engine group in a daisy chain configuration.

6. The method as claimed in claim 1, wherein calculating the hash value includes calculating the hash value as a SHA-256 value.

7. The method as claimed in claim 1, wherein calculating the test hash results includes calculating the test hash results at the safe overclock rate where the hashing error rate is above zero and below the hash error threshold.

8. A digital currency mining system comprising:
   a controller coupled to a plurality of hash engines configured to calculate test hash results and a hashing error rate at each of a set of hash clock frequencies, each of the hash clock frequencies above a safe overclock rate wherein the safe overclock rate has the hashing error rate of zero, identifying a target hash clock frequency equal to the a highest of the hash clock frequencies for each hash engine among the plurality of hash engines by comparing the hashing error rate to a hash error threshold wherein the hash error threshold is greater than an acceptable error rate, and calculating a hash value of a block header with the plurality of hash engines operating at the target hash clock frequency;
   a PLL clock configured to provide the target hash clock frequency to the plurality of hash engines of a hash engine group; and
   a storage device, coupled to the plurality of hash engines, for receiving the block header having a nonce value of a block.

9. The system as claimed in claim 8, wherein the controller is configured to compare each of the test hash results with a hash value for each of the hash clock frequencies in a clock range and each of the hash clock frequencies is at least 10% above the safe overclock rate.

10. The system as claimed in claim 8, wherein the plurality of hash engines are configured to operate a first hash engine at the target hash clock frequency to calculate a first hash value for a first nonce.

11. The system as claimed in claim 8, wherein the plurality of hash engines are partitioned into a first hash engine group and a second hash engine group, the first hash engine group is coupled to a first hash clock, the second hash engine group is coupled to a second hash clock line, and the first hash clock at a first hash clock frequency different than the second hash clock.

12. The system as claimed in claim 8, wherein the PLL clock includes a first hash clock coupled to a first hash engine of a first hash engine group and the first hash clock of the first hash engine of the first hash engine group coupled to a second hash engine of the first hash engine group in a daisy chain configuration.

13. The system as claimed in claim 8, wherein the plurality of hash engines are configured to calculate the hash value as a SHA-256 value.

14. The system as claimed in claim 8, wherein the plurality of hash engines are configured to calculate the test hash results at the safe overclock rate where the hashing error rate is above zero and below the hash error threshold.

15. One or more non-transitory computer-readable media storing instructions that, when executed by one or more computing devices, cause:
   calculating test hash results and a hashing error rate of each of a plurality of hash engines at each of a set of hash clock frequencies each of the hash clock frequencies above a safe overclock rate wherein the safe overclock rate has the hashing error rate of zero;
   identifying a target hash clock frequency equal to a highest of the hash clock frequencies for each hash engine among the plurality of hash engines by comparing the hashing error rate to a hash error threshold, the hash error threshold greater than an acceptable error rate;
   configuring a phase locked loop (PLL) clock to provide the target hash clock frequency to the plurality of hash engines of a hash engine group;
   generating a block header having a nonce value of a block; and calculating a hash value of the block header with the plurality of hash engines operating at the target hash clock frequency.

16. The non-transitory computer-readable media of claim 15, further comprising comparing each of the test hash results with a hash value for each of the hash clock frequencies in a clock range and each of the hash clock frequencies at least 10% above the safe overclock rate.

17. The non-transitory computer-readable media of claim 15, further comprising operating the first hash engine at the target hash clock frequency to calculate a first hash value for a first nonce.

18. The non-transitory computer-readable media of claim 15, further comprising:
    partitioning the plurality of hash engines into a first hash engine group and a second hash engine group;
    coupling the first hash engine group to a first hash clock;
    coupling the second hash engine group to a second hash clock line; and
    overclocking the first hash clock at a first hash clock frequency different than the second hash clock.

19. The non-transitory computer-readable media of claim 15, further comprising:
    coupling a first hash clock to a first hash engine of a first hash engine group; and
    coupling the first hash clock of the first hash engine of the first hash engine group to a second hash engine of the first hash engine group in a daisy chain configuration.

20. The non-transitory computer-readable media of claim 15, wherein calculating the test hash results includes calculating the test hash results at the safe overclock rate where the hashing error rate is above zero and below the hash error threshold.

* * * * *